(12) United States Patent
Takenaka et al.

(10) Patent No.: US 8,521,395 B2
(45) Date of Patent: Aug. 27, 2013

(54) CONTROL DEVICE OF INVERTED PENDULUM TYPE MOBILE APPARATUS

(75) Inventors: Toru Takenaka, Saitama (JP); Kazushi Akimoto, Saitama (JP); Shinichiro Kobashi, Saitama (JP); Hideo Murakami, Saitama (JP); Yuichi Uebayashi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 37 days.

(21) Appl. No.: 13/394,885

(22) PCT Filed: Sep. 18, 2009

(86) PCT No.: PCT/JP2009/004769
§ 371 (c)(1),
(2), (4) Date: Mar. 8, 2012

(87) PCT Pub. No.: WO2011/033592
PCT Pub. Date: Mar. 24, 2011

(65) Prior Publication Data
US 2012/0173114 A1    Jul. 5, 2012

(51) Int. Cl.
*G06F 19/00*    (2011.01)
(52) U.S. Cl.
USPC .......... 701/99; 701/49; 701/70; 701/124

(58) Field of Classification Search
USPC ............ 701/1, 70, 99, 124, 49; 180/7.1
See application file for complete search history.

(56) References Cited

U.S. PATENT DOCUMENTS 8,346,441 B2 *   1/2013   Miki et al. .............. 701/49

FOREIGN PATENT DOCUMENTS

| JP | 4-201793 A | 7/1992 |
|---|---|---|
| JP | 2004-129435 A | 4/2004 |
| JP | 2006-282160 A | 10/2006 |
| JP | 2009-083759 A | 4/2009 |
| WO | 2008/132778 A1 | 11/2008 |
| WO | 2008/132779 A1 | 11/2008 |
| WO | 2008/139740 A1 | 11/2008 |

* cited by examiner

*Primary Examiner* — Thomas Black
*Assistant Examiner* — Luke Huynh
(74) *Attorney, Agent, or Firm* — Carrier Blackman & Associates, P.C.; Joseph P. Carrier; William D. Blackman

(57) ABSTRACT

Provided is a control device of an inverted pendulum type mobile apparatus capable of support the body of a user on a base body with a foot of the user standing on the floor in a reclining state. If the reclining state where the user has the body supported by the base body with a foot thereof standing on the floor when the mobile apparatus 1 is in halt state is detected, a control unit 50 determines a manipulated variable for control (imaginary wheel rotational angular acceleration command) so as to drive a travelling motion unit 5 toward a direction for the base body 9 to support the body of the user.

7 Claims, 13 Drawing Sheets

CONTROL DEVICE OF INVERTED PENDULUM TYPE MOBILE APPARATUS

BACKGROUND OF THE INVENTION

1. Field of the Invention

The present invention relates to a control device of an inverted pendulum type mobile apparatus capable of moving on a floor surface.

2. Description of the Related Art

An inverted pendulum type mobile apparatus has a travelling motion unit capable of moving on a floor surface, an actuator which drives the travelling motion unit, and a base body mounted with the travelling motion unit and the actuator and configured to be tiltable with respect to the perpendicular direction. In order to maintain a tilt angle of the base body at a desired tilt angle (to prevent the base body from falling down), it is necessary to move the travelling motion unit by displacing a fulcrum of the inverted pendulum.

As this type of the inverted pendulum type mobile apparatus, for example, an inverted pendulum type vehicle disclosed in Patent Document 1 (U.S. Pat. No. 3,070,015) had been proposed by the present applicant. In the inverted pendulum type vehicle disclosed in the Patent Document 1, a base body of a vehicle assembled with a payload supporting part embarking a subject to be transported, namely, a user, is provided so as to be freely tiltable about two axes, specifically one axis in a longitudinal direction and the other axis in a lateral direction, with respect to the travelling motion unit having a ball shape. In the technology for controlling an inverted pendulum type vehicle, a driving torque of a motor is sequentially determined so as to approximate a difference between a measured value of a tilt angle of the base body (=tilt angle of the payload supporting part) and a desired tilt angle and a difference between a measured value of a velocity of the motor as an actuator unit (and consequently a travelling velocity of the travelling motion unit) and a desired velocity to 0. Thereafter, the travelling motion of the travelling motion unit is controlled via the motor according to the determined drive torque.

The present applicant further proposes vehicles capable of functioning as the inverted pendulum type mobile apparatus, such as those disclosed in Patent Document 2 (Published PCT International Application WO/2008/132778) and Patent Document 3 (Published PCT International Application WO/2008/132779).

PRIOR ART DOCUMENT

Patent Document

Patent Document 1: U.S. Pat. No. 3,070,015
Patent Document 2: Published PCT International Application WO/2008/132778
Patent Document 3: Published PCT International Application WO/2008/132779

SUMMARY OF THE INVENTION

Problems to be Solved by the Invention

As described in the Patent Document 1, the inverted pendulum type mobile apparatus capable of moving according to the tilt of the base body by a user is controlled to move toward the direction of a force for tilting the base body (external force); therefore, if a user reclines the vehicle when the mobile apparatus is in halt, the base body is tilted so that it will move toward the tilted direction. Thereby, it is impossible for the mentioned vehicle to realize a reclining state where the user has the body thereof supported by the base body with a foot thereof standing on the floor when, for example, the user sits down on the payload supporting part of the parking vehicle for a rest, or the user just lays his/her body weight on the vehicle while standing on ground without boarding the vehicle.

It is therefore an object of the present invention to provide a control device of an inverted pendulum type mobile apparatus capable of realizing the mentioned reclining state.

Means to Solve the Problem

A first aspect of the present invention provides a control device of an inverted pendulum type mobile apparatus having a travelling motion unit capable of moving on a floor surface, an actuator which drives the travelling motion unit, and a base body mounted with the travelling motion unit and the actuator and configured to be tiltable with respect to the perpendicular direction. The control device of an inverted pendulum type mobile apparatus of the first aspect of the present invention comprises: a tilt angle measuring element configured to generate an output according to an actual tilt angle of the base body; a force detector configured to detect at least a force applied to the base body in the horizontal direction; and a travelling motion unit controller configured to determine a manipulated variable for control which is configured to define a driving power to be applied to the travelling motion unit so as to approximate a tilt difference between the measured value of the tilt angle and the desired tilt angle to zero by using a measured value of a tilt angle of the base body denoted by the output from the tilt angle measuring element, a predefined value of a desired tilt angle, an output from the force detector; and a manipulation-adjusting variable allowed to be set variably; and to control the travelling motion of the travelling motion unit via the actuator according to the determined manipulated variable for control; wherein the travelling motion unit controller is configured to determine the manipulated variable for control of the travelling motion unit so as to tilt the base body toward the direction opposite to the direction of the force detected by the force detector (first invention).

According to the first invention, at least a force applied to the base body in the horizontal direction is detected by the force detector; the travelling motion unit controller configured to determine a manipulated variable for control which is configured to define a driving power to be applied to the travelling motion unit so as to tilt the base body toward the direction opposite to the direction of the force detected by the force detector.

Thereby, for example when a user lays his/her body weight on the base body while the user is standing, the manipulated variable for control is added appropriately to the desired tilt angle according to the load applied to the base body. Owning to the tilt, the mobile apparatus can generate a force in the direction of supporting the body of the user, enabling the user reclining on the base body in the reclining state. In other words, by setting the desired tilt angle of the base body to counter against the reclining load from the user, it is possible for the mobile apparatus to realize the reclining state.

In the present invention, "the direction of supporting the body of a user" is basically a direction opposite to the direction applied by the force detected by the force detector, for example, horizontal component of the direction toward the position of the user (for example, the center of gravity) taking the reclining posture against the travelling motion unit of the mobile apparatus.

A second aspect of the present invention provides a control device of an inverted pendulum type mobile apparatus having a travelling motion unit capable of moving on a floor surface, an actuator which drives the travelling motion unit, a base body mounted with the travelling motion unit and the actuator, and a payload supporting part for a user fixed to the base body so as to be tiltable with respect to the perpendicular direction. The control device of an inverted pendulum type mobile apparatus of the second aspect of the present invention comprises: a reclination detector configured to detect a reclining state where the user has the body thereof supported by the base body with a foot thereof standing on the floor when the mobile apparatus is in halt; a tilt angle measuring element configured to generate an output according to an actual tilt angle of the base body; and a travelling motion unit controller configured to determine a manipulated variable for control which is configured to define a driving power to be applied to the travelling motion unit so as to approximate a tilt difference between a measured value of the tilt angle and a desired tilt angle to zero by using the measured value of a tilt angle of the base body denoted by the output from the tilt angle measuring element, a predefined value of a desired tilt angle, a detection output from the reclination detector; and a manipulation-adjusting variable allowed to be set variably; and to control the travelling motion of the travelling motion unit via the actuator according to the determined manipulated variable for control; wherein the travelling motion unit controller is configured to determine the manipulated variable for control so as to drive the travelling motion unit toward a direction for the base body to support the body of the user when the reclining state is detected by the reclination detector (second invention).

In the first invention and the second invention, the term "floor" will be used to include an outdoor ground surface or a road surface rather than meaning only a floor in an ordinary sense (e.g., an indoor floor).

Moreover, "a predefined value of a desired tilt angle" not only includes setting the predefined value as the desired value (angle) preliminarily determined, but also includes determining a variable value (angle) according to a load (force) applied to the base body which will be described in embodiments hereinafter (FIG. 14 and FIG. 15).

According to the second invention, if the reclining state where the user has the body thereof supported by the base body with a foot thereof standing on the floor when the mobile apparatus is in halt is detected by the reclination detector, the travelling motion unit controller determines the manipulated variable for control so as to move the travelling motion unit toward a direction for the base body to support the body of the user.

Thereby, for example when the user sits down on the payload supporting part from the front side of the mobile apparatus with both feet on the floor, the manipulated variable for control is added appropriately to the desired tilt angle according to the load applied to the payload supporting part in the backward direction. Owning to the tilt, the mobile apparatus can generate a force in the direction of supporting the body of the user, enabling the reclining state of the user reclining on the base body. In other words, by setting the desired tilt angle of the base body to counter against the reclining load from the user, it is possible for the mobile apparatus to realize the reclining state.

In the inverted pendulum type vehicle according to the aspect of the invention, it is acceptable that the traveling motion unit is configured to be capable of moving in a predefined one direction on a floor surface and the payload supporting part is configured to be fixed at the base body so as to be tiltable about one axis in a direction orthogonal to the predefined one direction.

It is also acceptable that the traveling motion unit is configured to be capable of moving in all directions including a first direction and a second direction which are orthogonal to each other on a floor surface and the payload supporting part is configured to be fixed at the base body so as to be tiltable about two axes, specifically one axis in the first direction and the other axis in the second direction.

Herein, the traveling motion unit "being capable of moving in all directions, including the first direction and the second direction" means that the orientation of the velocity vector of the traveling motion unit at each instant observed in an axial direction orthogonal to the first direction and the second direction could take an orientation of an arbitrary angular orientation about the axial direction when the traveling motion unit is driven by the actuator. The axial direction is approximately a vertical direction or a direction perpendicular to a floor surface. Further, the term "orthogonal" in the present invention does not have to be absolutely orthogonal, and may slightly deviate from being absolutely orthogonal.

In the second invention, it is acceptable that the reclination detector is provided with a force detector configured to detect at least a force applied to the payload supporting part in the longitudinal direction; and the travelling motion unit controller is configured to determine the manipulated variable for control configured to impose a driving power to move the travelling motion unit so as to tilt the base body toward the direction opposite to the direction of the force detected by the force detector when the mobile apparatus is in halt (third invention).

According to the third invention, for example when the user sits down on the payload supporting part to reach the reclining state, the force applied to the payload supporting part to the backward direction thereof is detected by the force detector; thereby, the travelling motion unit controller imposes a driving power to drive the travelling motion unit so as to tilt the base body toward the direction (forward direction) opposite to the direction of the force detected by the force detector when the mobile apparatus is in halt. According thereto, the mobile apparatus is maintained halt at a position with the body of the user supported by the base body, enabling the user to take the reclining state against the base body.

In the third invention, it is acceptable that the force detector is a triaxial force sensor configured to detect a load applied to the payload supporting part; and the travelling motion unit controller is configured to determine the manipulated variable for control configured to impose the driving power according to an external force in the longitudinal direction detected by the triaxial force sensor (fourth invention).

It is also acceptable that in the third invention the force detector is a uniaxial force sensor configured to detect a load applied to the payload supporting part in the perpendicular direction; and the travelling motion unit controller is configured to determine the manipulated variable for control configured to impose the driving power according to a decrement in the load when the load detected by the uniaxial force sensor is less than the body weight of the user (fifth invention).

It is acceptable that in the second invention the reclination detector is provided with a manual switch disposed in the base body and detects the reclining state when the manual switch is turned on (sixth invention).

It is also acceptable that the reclination detector is provided with a foot-stepping force detector configured to detect a force applied to a foot step attached to the base body; and the travelling motion unit controller is configured to detect the reclining state when no force is detected by the foot-stepping force detector.

DETAILED DESCRIPTION OF THE PREFERRED EMBODIMENTS

An embodiment of the present invention will be described hereinafter. First, referring to FIG. 1 to FIG. 6, the structure of an inverted pendulum type mobile apparatus in the present embodiment will be described.

Figure 1:
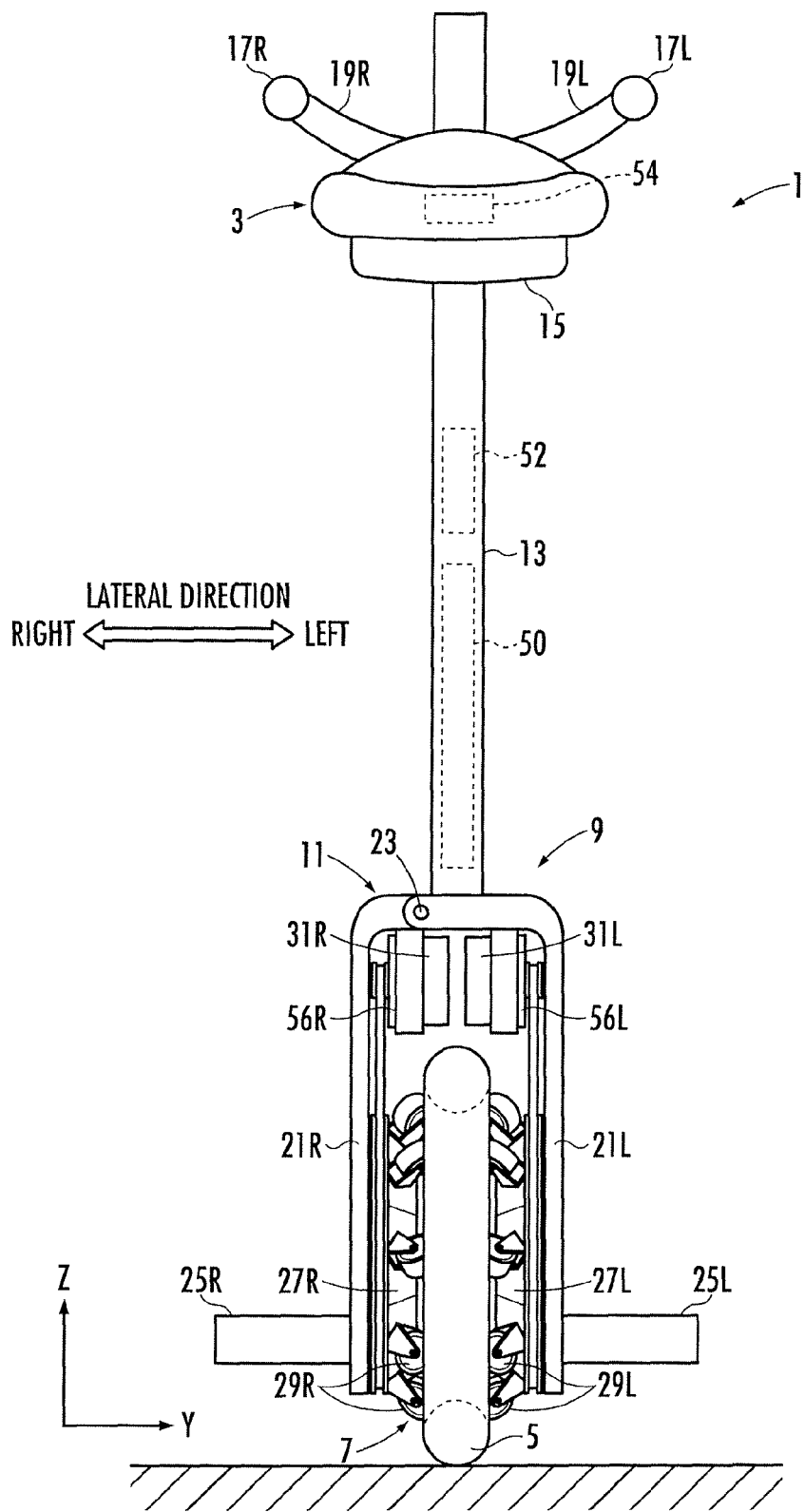
FIG. 1 is a front diagram of an inverted pendulum type vehicle according to an embodiment.
Figure 2:
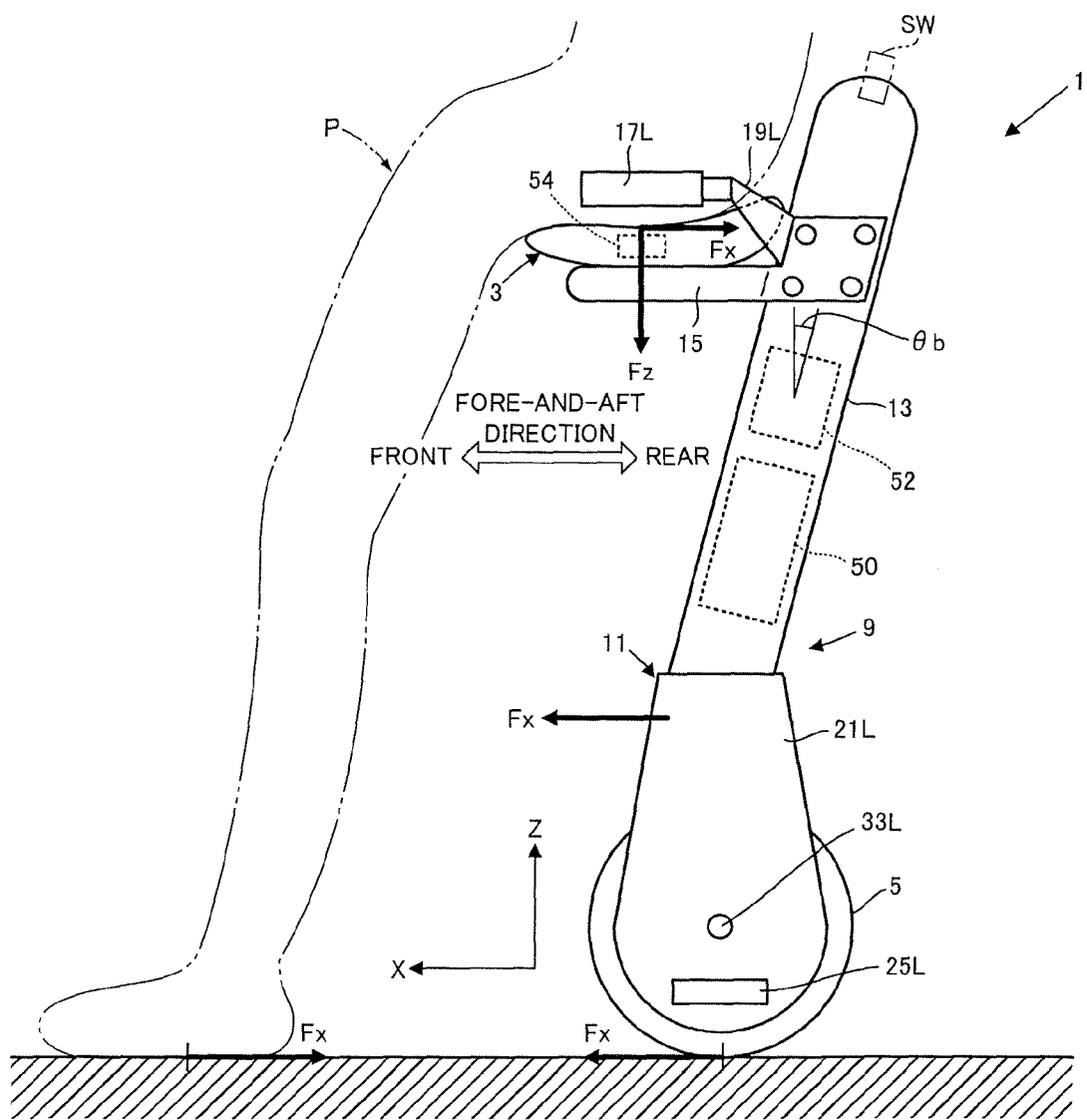
FIG. 2 is a side view of the inverted pendulum type vehicle according to the embodiment.

As illustrated in FIG. 1 and FIG. 2, the inverted pendulum type mobile apparatus in the present embodiment is an inverted pendulum type vehicle for a user to board. The vehicle 1 includes a payload supporting part 3 for a user (a driver or an occupant), a traveling motion unit 5 capable of traveling in all directions (all directions in 2 dimensions, including a fore-and-aft direction and a lateral direction) on a floor surface while being in contact with a floor surface, an actuator 7 which imparts to the traveling motion unit 5 a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of a user aboard the payload supporting part 3 in a normal posture. Incidentally, "the normal posture" is a posture envisaged in the design related to the payload supporting part 3, and it is a posture in which the trunk axis of the upper body of the user is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side of the vehicle 1, respectively.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for a user. Hence, the inverted pendulum type vehicle 1 (hereinafter referred to simply as the vehicle) in the present embodiment travels on a floor surface with a user seated on the seat 3.

Further, grips 17R and 17L to be grasped as necessary by the user seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the user seated on the seat 3 rests his/her right foot and a step 25L on which the user rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of the Patent Document 2 mentioned above. Hence, in the description of the present embodiment, the aspects of the structures of the traveling motion unit 5 and the actuator 7 which are described in the Patent Document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

Figure 5:
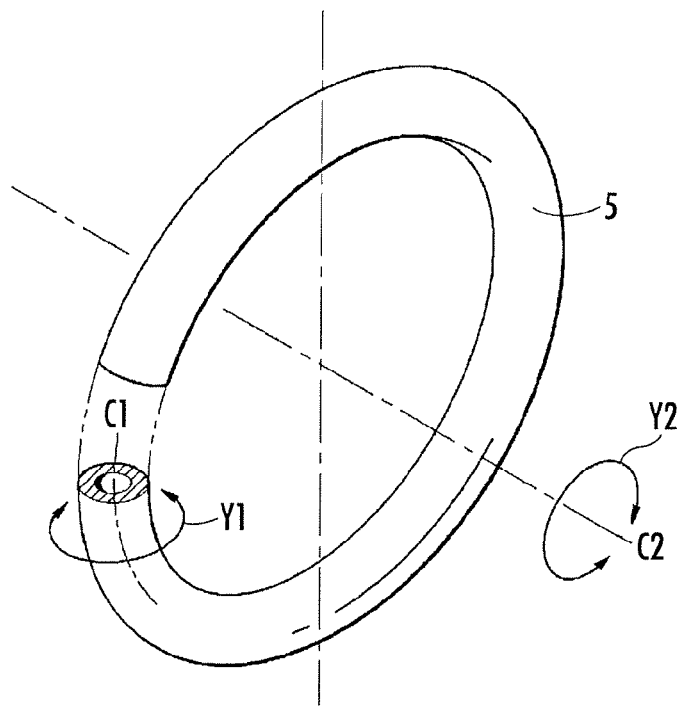
FIG. 5 is a perspective view of a traveling motion unit (wheel assembly) of the inverted pendulum type vehicle according to the embodiment.

The wheel assembly 5 is capable of performing a motion of rotating about the axial center C2 of the wheel assembly as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 17L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
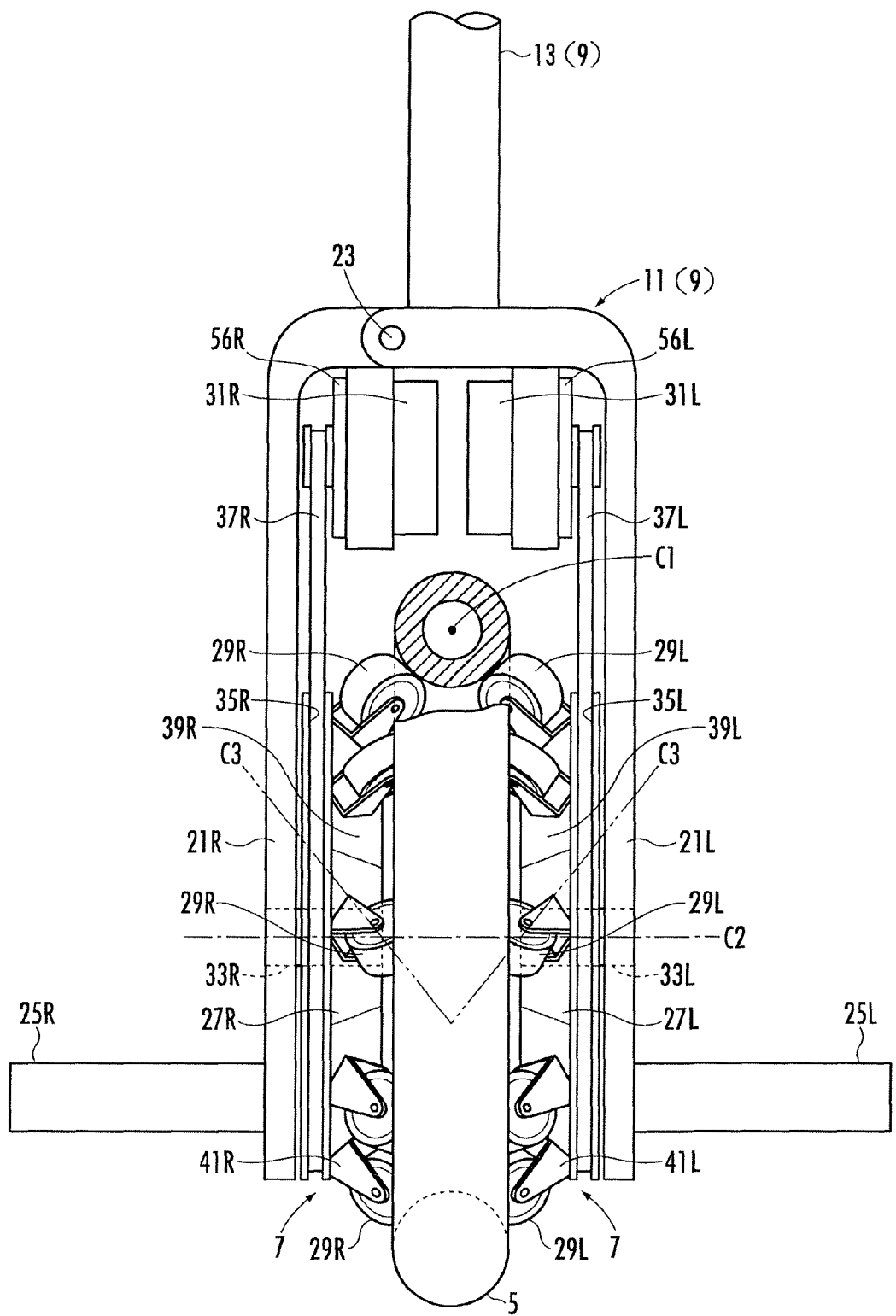
FIG. 3 is an enlarged view of a lower portion of the inverted pendulum type vehicle according to the embodiment.
Figure 4:
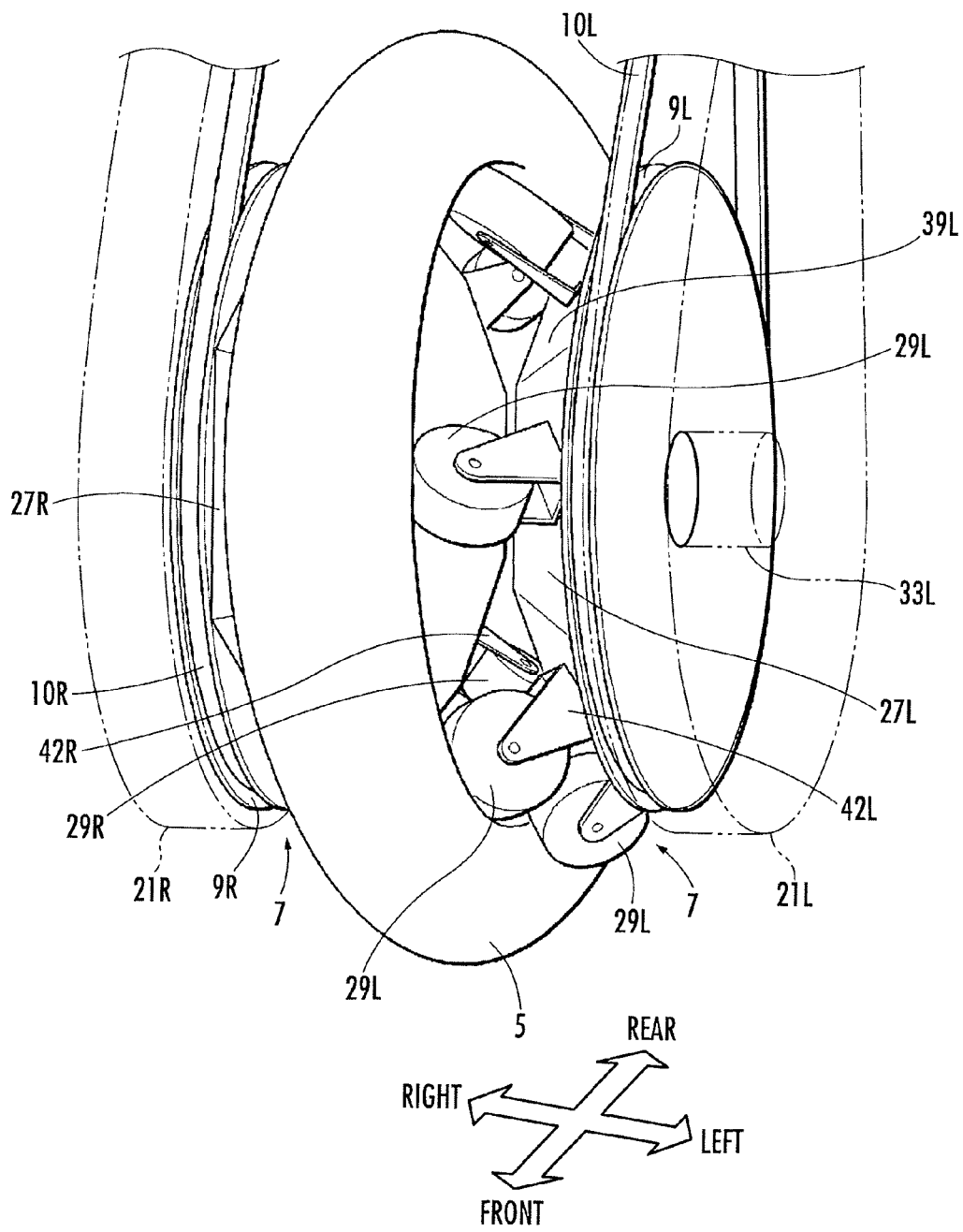
FIG. 4 is a perspective view of the lower portion of the inverted pendulum type vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

The power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
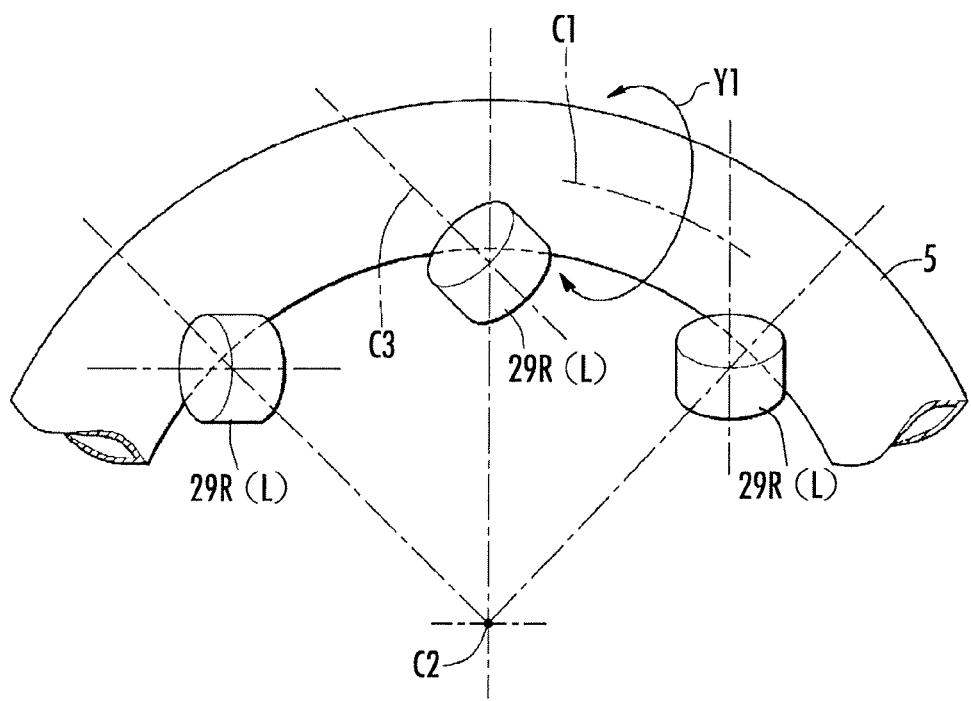
FIG. 6 is a diagram illustrating the placement relationship between the traveling motion unit (wheel assembly) and free rollers of the inverted pendulum type vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact state with the wheel assembly 5 (more specifically, the press contact state that enables a frictional force to act between the free rollers 29R and 29L and the wheel assembly 5).

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

The seat (payload supporting part) 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the user (referring to an occupant here) seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward. In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, in a state wherein an occupant is aboard the vehicle 1, the posture of the base body 9 in a state wherein the overall center-of-gravity point of the occupant and the vehicle 1 (more specifically, the overall center-of-gravity point of all parts among the occupant and the vehicle 1 tiltable together with the occupant and the seat 3) is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture, and basically, the traveling motion of the wheel assembly 5 is controlled such that the actual posture of the base body 9 is converged to the desired posture.

Further, in a state wherein no occupant is aboard, the posture of the base body 9 in a state which the center-of-gravity point of the vehicle 1 alone is positioned substantially right above the central point of the wheel assembly 5 (the central point on the axial center C2) (a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Either in the state where the occupant is aboard the vehicle 1 or in the state where no occupant is aboard the vehicle 1, the wheel assembly 5 is controlled to increase the travelling velocity of the vehicle 1 when the deviation of the actual posture of the base body 9 from the desired posture becomes greater and to stop the vehicle 1 from travelling when the actual posture of the base body 9 matches the desired posture.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

According to the present embodiment, in order to control the operation of the vehicle 1 as described above, a control unit 50 constituted of an electronic circuit unit which mainly includes a microcomputer and a drive circuit unit for the electric motors 31R and 31L, a tilt sensor 52 for measuring a tilt angle θb relative to the vertical direction (the gravitational direction) of a predefined portion of the base body 9 and a changing velocity thereof (=dθb/dt), a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50 and the tilt sensor 52 are installed to the support frame 13 by, for example, being accommodated in the support frame 13 of the base body 9. Further, the load sensor 54 is incorporated in the seat 3. Further, the rotary encoders 56R and 56L are provided integrally with the electric motors 31R and 31L. The rotary encoders 56R and 56L may alternatively be attached to the rotating members 27R and 27L, respectively.

More specifically, the tilt sensor 52 is constructed of an acceleration sensor and a rate sensor (angular velocity sensor), such as a gyro sensor, and outputs detection signals of these sensors to the control unit 50. Then, the control unit 50 performs predefined measurement arithmetic process (this may be publicly known arithmetic process) on the basis of the outputs (a detection signal of the acceleration sensor and the rate sensor) of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, the tilt angle θb to be measured (hereinafter referred to a base body tilt angle θb in some cases) is constituted of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is constituted of a component in the direction about the Y-axis (the pitch direction) θbdot_x (=dθb_x/dt) and a component in the direction about the X-axis (the roll direction) θbdot_y (=dθb_y/dt).

Supplementally, according to the present embodiment, the seat 3 tilts integrally with the support frame 13 of the base body 9, so that the base body tilt angle θb also equals to the tilt angle of the seat (payload supporting part) 3.

In the description of the present embodiment, for variables related to a motional state amount having components in directions of the X-axis and the Y-axis, such as the base body tilt angle θb (or directions about each axes), or variables, such as coefficients related to the motional state amount, the reference numerals of the variables will be accompanied by a suffix "_x" or "_y" to distinguishably denote the components.

Accordingly, for the variables related to translational motions, such as a translational velocity, a component in the X-axis direction thereof will be accompanied by the suffix "_x" and a component in the Y-axis direction thereof will be accompanied by the suffix "_y."

Meanwhile, for the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference numeral of the variable. For example, to express the base body tilt angle θb in the form of the pair of a component in the direction about the Y-axis θb_x and a component in the direction about the X-axis θb_y, it will be denoted as the base body tilt angle θb_xy.

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predefined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 performs predefined arithmetic process by using the measured values thereby to determine velocity commands, which are the desired values of the rotational angular velocities of the electric motors 31R and 31L, respectively, and performs feedback control on the rotational angular velocity of each of the electric motors 31R and 31L according to the determined velocity commands.

The rotational angular velocity of the output shaft of the electric motor 31R and the rotational angular velocity of the rotating member 27R have a proportional relationship based on the speed reduction ratio of a fixed value between the output shaft and the rotating member 27R. Hence, for the sake of convenience, in the description of the present embodiment, the rotational angular velocity of the electric motor 31R may be used to express the rotational angular velocity of the rotating member 27R. Similarly, the rotational angular velocity of the electric motor 31L may be used to express the rotational angular velocity of the rotating member 27L.

The following will describe in more detail the control process performed by the control unit 50.

Figure 7:
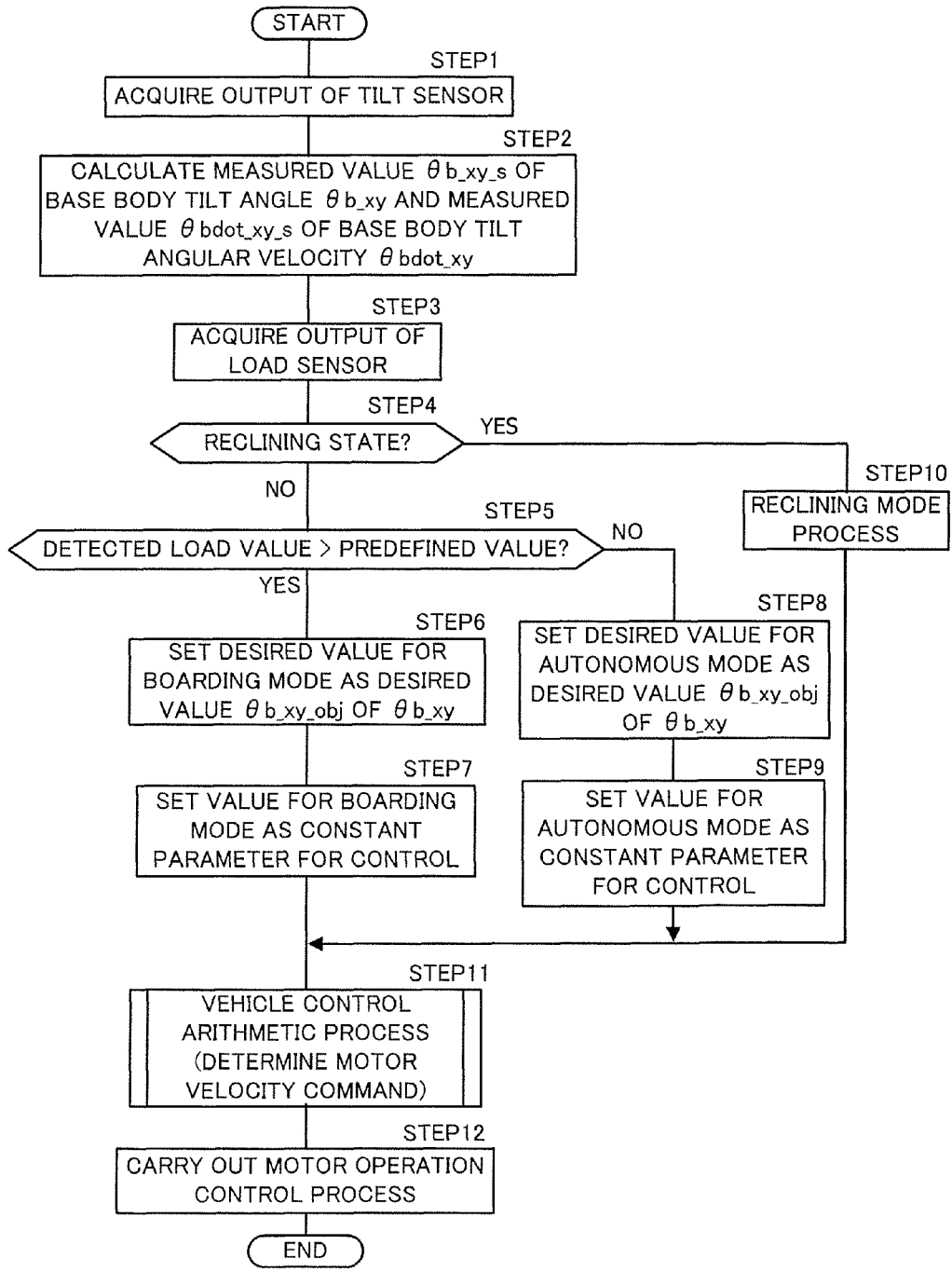
FIG. 7 is a flowchart illustrating a process performed by a control unit 50 of the inverted pendulum type vehicle according to the embodiment.

The control unit 50 executes the control process (main routine process) illustrated by the flowchart of FIG. 7 at a predefined cycle.

First, in STEP 1, the control unit 50 acquires an output of a tilt sensor 52.

Subsequently, the control unit 50 proceeds to STEP 2 to calculate a measured value θb_xy_s of a base body tilt angle θb and a measured value θbdot_xy_s of a base body tilt angular velocity θbdot on the basis of the acquired output of the tilt sensor 52.

In the following description, when using a reference numeral to denote the observed value (the measured value or an estimated value) of an actual value of a variable (a state amount), such as the measured value θb_xy_s of the base body tilt angle θb, the reference numeral of the variable will have a suffix "_s".

Subsequently, the control unit 50 acquires an output of a load sensor 54 in STEP 3.

Thereafter, the control unit 50 performs a reclining state determining process in STEP 4. The reclining state means a state that the occupant has the body thereof supported by the base body with a foot thereof standing on the floor when the vehicle is in halt state. As an example, in FIG. 2, the occupant P has both feet standing on the floor and sits down on the seat (payload supporting part) 3 from the front side of the vehicle 1 in a halt state.

In the present embodiment, the reclining state is detected as described in the following. Specifically, the load sensor 54 is used as a force sensor for detecting at least a force Fx applied to the seat 3 in the longitudinal direction (X-axis direction). If the force Fx in the longitudinal direction is detected by the force sensor when the vehicle 1 is in halt, then it is determined as the reclining state. In this case, Fx is substantially equal to the frictional force applied from the floor to the feet of the occupant. The force sensor for detecting the force may be a triaxial force sensor capable of detecting a load applied to the payload supporting part in 3 directions of X, Y and Z axes.

It is acceptable that the load sensor 54 is a uniaxial force sensor for detecting a load Fz applied to the payload supporting part in the vertical direction (Z-axis direction). If a load detected by the uniaxial force sensor is less than the body weight of the occupant measured preliminarily, then it is determined that the occupant is in a state sitting on the payload supporting part with both feet contacting the floor (the reclining state).

In place of determining from the output from the mentioned force sensor, it is acceptable to dispose a manual button switch SW as illustrated by chain lines in FIG. 2 at the upper end of the base body 9, for example, to determine the reclining state when the button switch is on. In this case, however, it is necessary for the occupant to push the button switch SW first and recline against the vehicle thereafter or push the button switch SW while sitting on the payload supporting part.

As mentioned in the above, if the determination result in STEP 4 is YES, in other words, it is determined that the occupant is in the reclining state, the control unit 50 performs a reclining mode process in STEP 10, the details thereof will be described hereinafter.

On the other hand, if the determination result in STEP 4 is NO, in other words, it is determined that the occupant is not in the reclining state, the control unit 50 determines whether or not the occupant is aboard on the vehicle 1 (whether or not the occupant is sitting on the seat 3) according to the determination whether or not a measured load value denoted by the output acquired from the load sensor 54 is greater than a preliminarily set defined value.

If the determination result in STEP 5 is affirmative (aboard), then the control unit 50 performs a process for setting a desired value θb_xy_obj of the base body tilt angle θb and a process for setting the values of constant parameters (e.g., the basic values of various gains) for controlling the operation of the vehicle 1 in STEP 6 and STEP 7, respectively.

In STEP 6, the control unit 50 sets a predefined desired value for a boarding mode as the desired value θb_xy_obj of the base body tilt angle θb.

Here, the term "boarding mode" means the operation mode of the vehicle 1 in the case where the occupant is aboard the vehicle 1. The desired value θb_xy_obj for the boarding mode is preset such that desired value θb_xy_obj coincides or substantially coincides with the measured value θb_xy_s of the base body tilt angle θb measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5.

Thereafter, in STEP 7, the control unit 50 sets predefined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

On the other hand, if the determination result in STEP 5 is negative (not aboard), then the control unit 50 performs the process for setting a desired value θb_xy_obj of a base body tilt angle θb_xy and the process for setting the values of constant parameters for controlling the operation of the vehicle 1 in STEP 8 and STEP 9, respectively.

In STEP 8, the control unit 50 sets a predefined desired value for an autonomous mode as the desired value θb_xy_obj of the base body tilt angle θb.

Here, the term "autonomous mode" means an operation mode of the vehicle 1 in the case where the occupant is not aboard the vehicle 1. The desired value θb_xy_obj for the autonomous mode is preset such that desired value θb_xy_obj coincides or substantially coincides with the measured value θb_xy_s of the base body tilt angle θb measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value θb_xy_obj for the autonomous mode is generally different from the desired value θb_xy_obj for the boarding mode.

In STEP 9, the control unit 50 sets predefined values for the autonomous mode as the values of constant parameters for controlling the operation of the vehicle 1. The values of the constant parameters for the autonomous mode are different from the values of the constant parameters for the boarding mode. The values of the constant parameters are set to be different between the boarding mode and the autonomous mode, because the response characteristics of the operations of the vehicle 1 relative to control inputs are different from each other due to the differences in the height of the center-of-gravity point, the overall mass, and the like between the respective modes.

In the reclining mode process in STEP 10, the control unit 50 performs a desired value setting process for setting a desired value θb_xy_obj of a base body tilt angle θb_xy and a parameter value setting process for setting the values of constant parameters for controlling the operation of the vehicle 1.

In the desired value setting process, the control unit 50 sets the preliminarily defined desired value for the reclining mode as the desired value θb_xy_obj of the tilt angle θb.

Herein, the reclining mode refers to an operation mode of the vehicle 1 when the occupant is in the reclining state. The desired value θb_xy_obj for the reclining mode is preset such that desired value θb_xy_obj coincides (or substantially coincides) with the measured value θb_xy_s of the base body tilt angle θb measured on the basis of an output of the tilt sensor 52 in a posture of the base body 9 in which the vehicle-occupant overall center-of-gravity point is positioned substantially right above a ground contact surface of the wheel assembly 5.

In the parameter value setting process, the control unit 50 sets the preliminarily defined values for the reclining mode as the values of constant parameters for controlling the operation of the vehicle 1. The values of constant parameters for the reclining mode are different from the values of constant parameters for the boarding mode and for the autonomous mode.

According to the processes from STEP 4 to STEP 10 described above, the desired value θb_xy_obj of the base body tilt angle θb_xy and the values of the constant parameters are set for each of the operational modes, namely, the boarding mode, the autonomous mode and the reclining mode.

It is not essential to perform the process in STEP 6 and STEP 7 or the process in STEP 8 and STEP 9 for each control processing cycle. Alternatively, the process may be performed only when the determination result in STEP 4 or STEP 5 changes.

Supplementally, in each of the boarding mode, the autonomous mode and the reclining mode, the desired value of a component θbdot_x in the direction about a Y-axis of the base body tilt angular velocity θbdot and the desired value of a component θbdot_y in the direction about an X-axis thereof are equal to 0. Therefore, it is unnecessary to perform the processing for setting a desired value of the base body tilt angular velocity θbdot_xy.

After performing the process in STEP 5 and STEP 6 or the process in STEP 7 and STEP 8 or the process in STEP 10 as described above, the control unit 50 performs vehicle control arithmetic process in STEP 11 thereby to determine the speed commands for electric motors 31R and 31L, respectively. The vehicle control arithmetic process will be discussed in detail hereinafter.

Subsequently, the control unit 50 proceeds to STEP 12 to perform the processing for controlling the operations of the electric motors 31R and 31L according to the speed commands determined in STEP 9. In this operation control processing, based on the difference between the speed command for the right side electric motor 31R determined in STEP 9 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control process performed by the control unit 50.

The vehicle control arithmetic process in STEP 11 mentioned above will now be described in detail.

Figure 8:
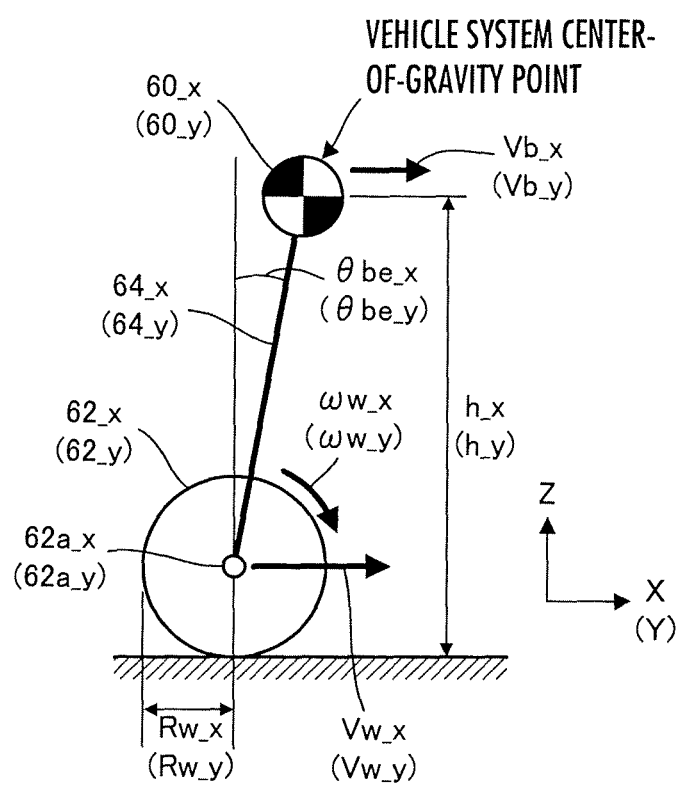
FIG. 8 is a diagram illustrating an inverted pendulum model expressing the dynamic behaviors of the inverted pendulum type vehicle according to the embodiment.

In the following description, the vehicle-occupant overall center-of-gravity point and the vehicle-alone center-of-gravity point are generically referred to as the vehicle system center-of-gravity point (FIG. 8). The vehicle system center-of-gravity point is referred to as the vehicle-occupant overall center-of-gravity point when the operational mode of the vehicle 1 is in the boarding mode or in the reclining mode and is referred to as the vehicle-alone center-of-gravity point when the operational mode of the vehicle 1 is in the autonomous mode.

In the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value generally denotes a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

In the present embodiment, the vehicle control arithmetic process in STEP 9 is performed, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, the reference numerals without parenthesis denote the reference numerals associated with the inverted pendulum model observed from the Y-axis direction, while the reference numerals in parenthesis denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as a fulcrum.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the reference numerals in parenthesis in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predefined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \qquad \text{Expression 01a}$$

$$\omega w\_y = C \cdot (\omega\_R - \omega\_L)/2 \qquad \text{Expression 01b}$$

Wherein, "C" in the expression 01b denotes a coefficient of a predefined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

The dynamics of the inverted pendulum model shown in FIG. 8 is represented by expressions 03x and 03y given below. Herein, the expression 03x represents the dynamics of the inverted pendulum model observed from the Y-axis direction, and the expression 03y represents the dynamics of the inverted pendulum model observed from the X-axis direction.

$$d^2\theta be\_x/dt^2 = \alpha\_x \cdot \theta be\_x + \beta\_x \cdot \omega wdot\_x \qquad \text{Expression 03x}$$

$$d^2\theta be\_y/dt^2 = \alpha\_y \cdot \theta be\_y + \beta\_y \cdot \omega wdot\_y \qquad \text{Expression 03y}$$

Wherein, ωwdot_x in the expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in the expression 03y.

As may be understood from these expressions 03x and 03y, the motions of the mass points 60_x and 60_y of the inverted pendulum (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic processing in STEPS, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ωL_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Supplementally, in the imaginary wheel rotational angular acceleration commands ωwdot_x_cmd and ωwdot_y_cmd serving as the manipulated variables (control inputs) in the present embodiment, since ωwdot_x_cmd is related to the rotational angular acceleration of the imaginary wheel 62_x moving in the X-axis direction, it functions as the manipulated variable for defining the driving power applied to the wheel assembly 5 to move the wheel assembly 5 in the X-axis direction; similarly, since ωwdot_y_cmd is related to the rotational angular acceleration of the imaginary wheel 62_y moving in the Y-axis direction, it functions as the manipulated variable for defining the driving power applied to the wheel assembly 5 to move the wheel assembly in the Y-axis direction.

Figure 9:
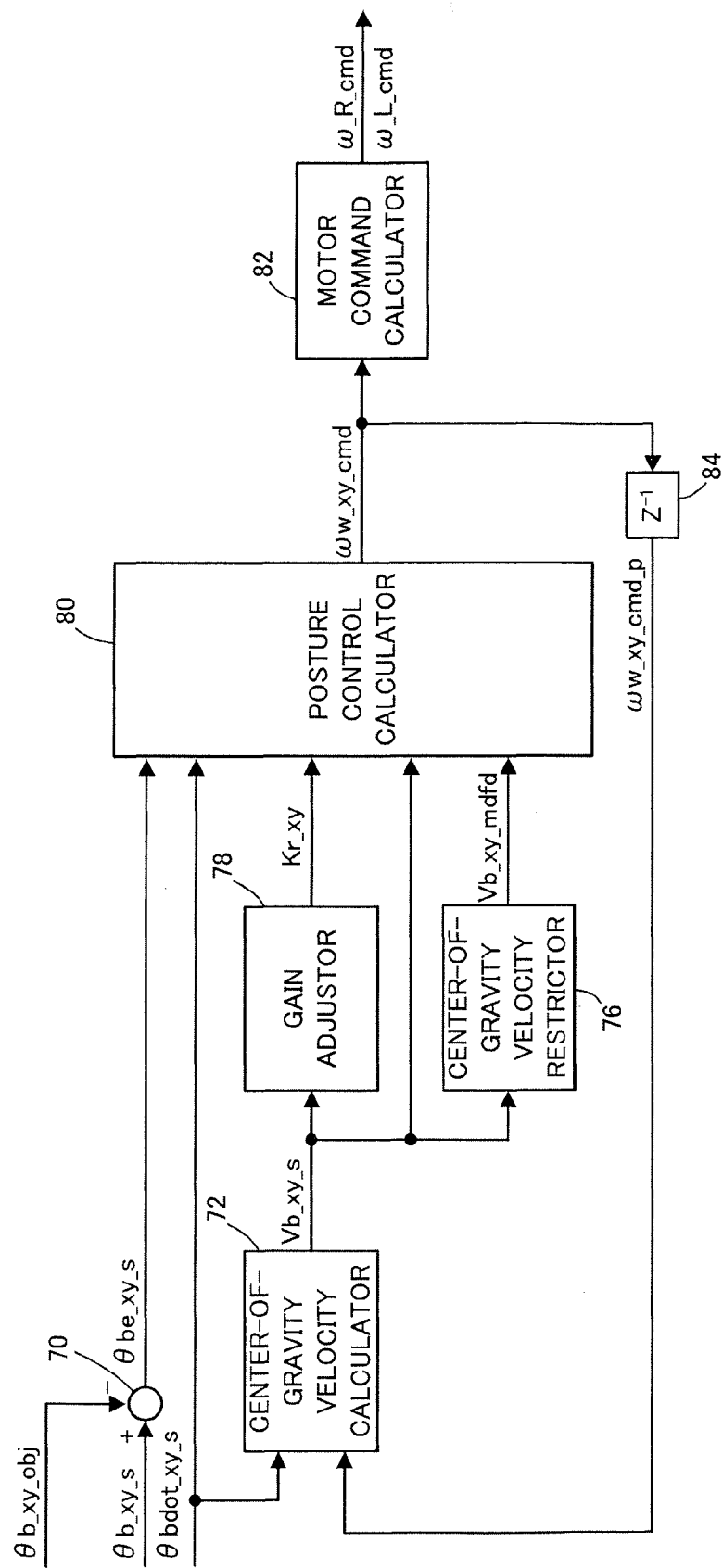
FIG. 9 is a block diagram illustrating a processing function related to the process illustrated in FIG. 7.

As illustrated in the block diagram of FIG. 9, the control unit 50 is provided with the functions for performing the vehicle control arithmetic process in STEP 11 as described above.

More specifically, the control unit 50 is provided with an error calculator 70 configured to calculate a difference, namely the base body tilt angle error measured value θbe_xy_s between the base body tilt angle measured value θb_xy_s and the base body tilt angle desired value θb_xy_obj, a center-of-gravity velocity calculator 72 configured to calculate an estimated center-of-gravity velocity value Vb_xy_s as an observed value of a center-of-gravity velocity Vb_xy which is the moving velocity of the vehicle system center-of-gravity point, a center-of-gravity velocity restrictor 76 configured to determine a desired center-of-gravity velocity for control Vb_xy_mdfd as the desired value of the center-of-gravity velocity Vb_xy by taking into account a restriction based on a permissible range of the rotational angular velocities of the electric motors 31R and 31L, and a gain adjustor 78 configured to determine a gain adjustment parameter Kr_xy for adjusting the values of the gain coefficients of expressions 07x and 07y to be described hereinafter.

The control unit 50 is further provided with a posture control calculator 80 configured to calculate the imaginary wheel rotational angular velocity command ωw_xy_cmd, and a motor command calculator 82 configured to convert the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by a posture control calculator 80. The delay element 84 outputs a previous value ωw_xy_cmd_p of the imaginary wheel rotational angular velocity command ωw_xy_cmd at each control processing cycle.

The vehicle control arithmetic process in STEP 11 described above is performed by the processing sections as described below.

First, the control unit 50 performs the process by the error calculator 70 and the process by the center-of-gravity velocity calculator 72.

The error calculator 70 receives the base body tilt angle measured values θb_xy_s (θb_x_s and θb_y_s) calculated in the STEP 2 and the desired values θb_xy_obj (θb_x_obj and θb_y_obj) set in the STEP 6 or STEP 8. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The process by the error calculator 70 may be carried out before the vehicle control arithmetic process in STEP 11. For example, the process by the error calculator 70 may be carried out during the process in the STEP 6, STEP 8 or STEP 10.

The center-of-gravity velocity calculator 72 receives the current value of the base body tilt angular velocity measured values θbdot_xy_s (θbdot_x_s and θbdot_y_s) calculated in the STEP 2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predefined arithmetic expression based on the inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \qquad 05x$$

$$Vb\_y\_s = Rw\_y \cdot \omega w\_y\_cmd\_p + h\_y \cdot \theta bdot\_y\_s \qquad 05y$$

In the expressions 05x and 05y, Rw_x and Rw_y denote the radii of the imaginary wheels 62_x and 62_y, respectively, as described above, and the values thereof are predefined values set preliminarily.

Further, reference characters h_x and h_y denote the heights of the mass points 60_x and 60_y, respectively, of the inverted pendulum model. In the present embodiment, the height of the vehicle system center-of-gravity point is maintained to be substantially constant. Thus, the predefined values set preliminarily are used as the values of h_x and h_y, respectively. Supplementally, the heights h_x and h_y are included in the constant parameters for setting the values in the STEP 7, STEP 9 or STEP 10.

The first term of the right side of the expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of the expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to the expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 performs the process by the center-of-gravity velocity restrictor 76 and the process by the gain adjustor 78. In this case, the center-of-gravity velocity restrictor 76 and the gain adjustor 78 receive respectively the estimated center-of-gravity velocity values Vb_xy_s (Vb_x_s and Vb_y_s) calculated by the center-of-gravity velocity calculator 72 as described above.

Thereafter, the gain adjustor 78 determines the gain adjustment parameters Kr_xy (Kr_x and Kr_y) on the basis of the input estimated center-of-gravity velocity values Vb_xy_s (Vb_x_s and Vb_y_s). The process performed by the gain adjustor 78 will be described hereinafter with reference to FIG. 10 and FIG. 11.

Figure 10:
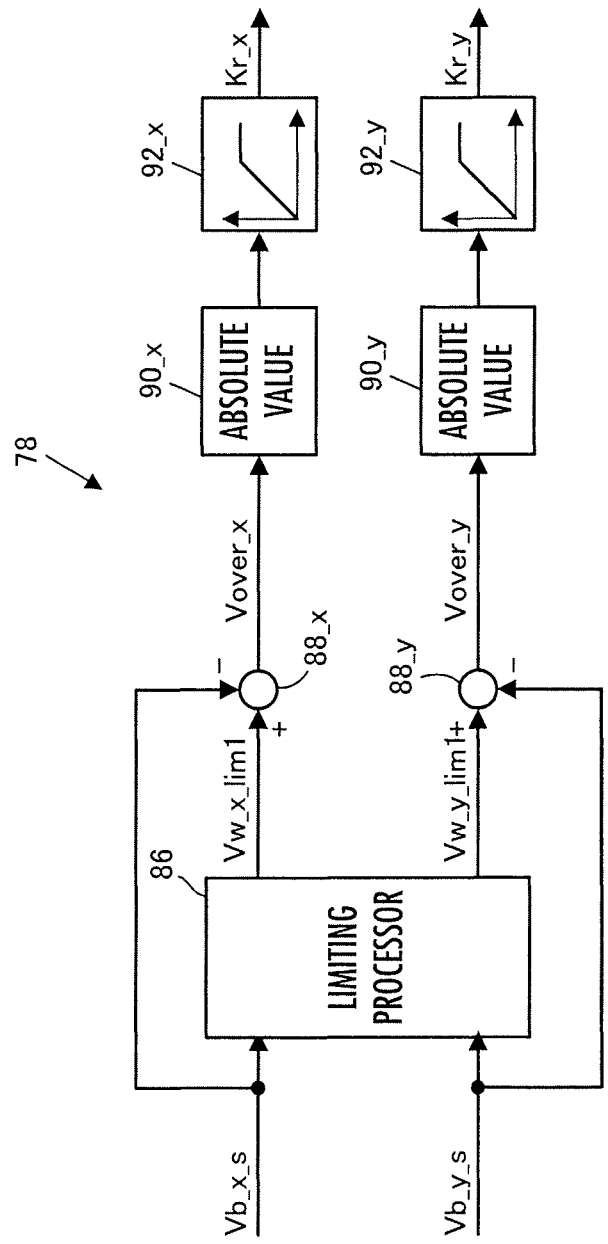
FIG. 10 is a block diagram illustrating a processing function of a gain adjusting element illustrated in FIG. 9.

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 is a value obtained after limiting the moving velocity Vw_x of the imaginary wheel 62_x in the X-axis direction and the output value Vw_y_lim1 is a value obtained after limiting the moving velocity Vw_y of the imaginary wheel 62_y in the Y-axis direction.

Figure 11:
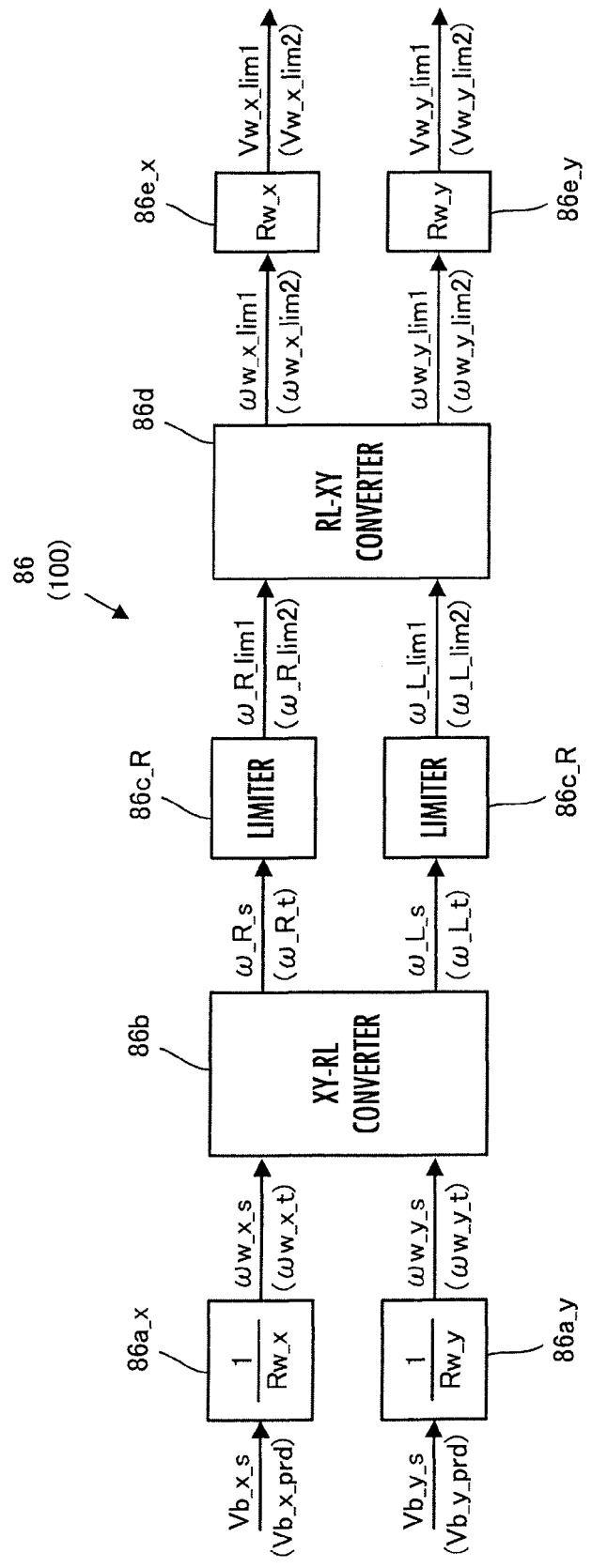
FIG. 11 is a block diagram illustrating a processing function of a limiting processor illustrated in FIG. 10 (or a limiting processor illustrated in FIG. 12)

The process performed by the limiting processor 86 will be described in further detail with reference to FIG. 11. The reference characters in parenthesis in FIG. 11 denote the process performed by a limiting processor 100 of the center-of-gravity velocity restrictor 76, which will be discussed later, and may be ignored in the description related to the process performed by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and ωw_y_s into a pair of the rotational angular velocity ω_R_s of the electric motor 31R and the rotational angular velocity ω_L_s of the electric motor 31L by an XY-RL converter 86b. The conversion is implemented by solving a simultaneous equation obtained by replacing ωw_x, ωw_y, ω_R and ω_L of the expressions 01a and 01b with ωw_x_s, ωw_y_s, ω_R_s and ω_L_s, respectively, taking the ω_R_s and ω_L_s as unknowns.

Subsequently, the limit processor 86 supplies the output values ω_R_s and ω_L_s of the XY-RL converter 86b to limiters 86c_R and 86c_L, respectively. At this time, the limiter 86c_R directly outputs the ω_R_s as an output value ω_R_lim1 if the ω_R_s falls within the permissible range for the right motor, which has an upper limit value (>0) and a lower limit value (<0) of predefined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value ω_L_lim1 if the ω_L_s falls within the permissible range for the left motor, which has an upper limit value (>0) and a lower limit value (<0) of predefined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high, and thereby, to prevent the maximum value of the torque that can be output by the electric motor 31R from decreasing. This applies also to the permissible range for the left motor.

Subsequently, the limit processor 86 converts the pair of the output values ω_R_lim1 and ω_L_lim1 of the limiters 86c_R and 86c_L, respectively, into a pair of the rotational angular velocities ωw_x_lim1 and ωw_y_lim1 of the imaginary wheels 62_x and 62_y, respectively, by an RL-XY converter 86d.

The conversion is in inverse relation to the conversion process performed by the XY-RL converter 86b. This conversion is implemented by solving a simultaneous equation obtained by replacing ωw_x, ωw_y, ω_R and ω_L of the expressions 01a and 01b with ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86d to processors 86e_x and 86e_y, respectively. The processor 86e_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86e_y converts ωw_y_lim1 into the moving velocity Vw_y_lim1 of the imaginary wheel 62_y (=ωw_y_lim1·Rw_y).

If it is assumed that the process performed by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then performs the process by calculators 88_x and 88_y. The calculator 88_x receives the estimated center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

If the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both zero.

On the other hand, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1−Vb_x_s) and a corrected amount from Vb_y_s of Vw_y_lim1 (=Vw_y_lim1−Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic means that if the input value increases to a certain level, then a change amount of an output value relative to an increase in the input value becomes zero or approaches to zero.

According to the present embodiment, if the input value |Vover_x| is a preset, predefined value or less, then the processor 92_x outputs, as Kr_x, a value obtained by multiplying the input value |Vover_x| by a proportionality coefficient of a predefined value. Further, if the input value |Vover_x| is larger than the predefined value, then the processor 92_x outputs 1 as Kr_x. The proportionality coefficient is set such that the product of |Vover_x| and the proportionality coefficient becomes 1 when |Vover_x| agrees with a predefined value.

The process performed by processors 90_y and 92_y is the same as that performed by the processors 90_x and 92_x, respectively, described above.

If the output values Vw_x_lim1 and Vw_y_lim1 in the limiting processor 86 are not forcibly restricted by the process performed by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be 0. Therefore, generally, Kr_x=Kr_y=0.

On the other hand, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the corrected amounts Vover_x and Vover_y, respectively. In this case, Kr_x is determined to be a larger value as the absolute value of the corrected amount Vx_over increases, the upper limit value thereof being 1. The same applies to Kr_y.

Figure 12:
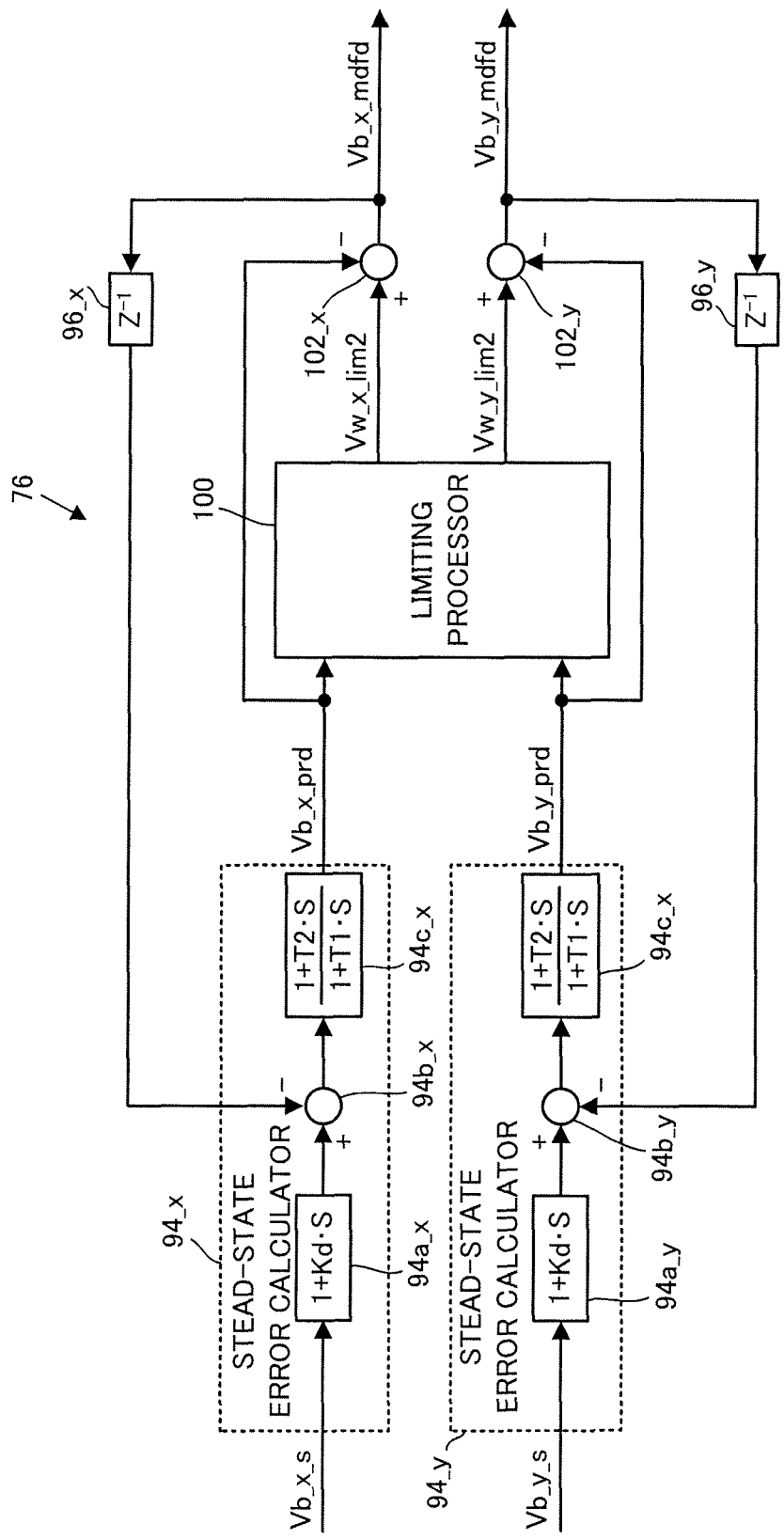
FIG. 12 is a block diagram illustrating a processing function of a center-of-gravity velocity restrictor 76 illustrated in FIG. 9.

The estimated center-of-gravity velocities Vb_xy_s (Vb_x_s and Vb_y_s) are input into the center-of-gravity velocity restrictor 76, and the center-of-gravity velocity restrictor 76 performs the process illustrated by the block diagram of FIG. 12 by using the above input values to determine desired center-of-gravity velocities for control Vb_xy_mdfd (Vb_x_mdfd and Vb_y_mdfd).

Specifically, the center-of-gravity velocity restrictor 76 first performs the process by stead-state error calculators 94_x and 94_y.

In this case, the stead-state error calculator 94_x receives the estimated center-of-gravity velocity value in the X-axis direction Vb_x_s and also receives the previous value Vb_x_mdfd p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94$a$_x. The proportional-differential compensation component 94_x is a compensation component whose transfer function is denoted by $1+Kd \cdot S$, and adds the input Vb_x_s and the value obtained by multiplying the differential value thereof (temporal change rate) by a coefficient Kd of a predefined value, and outputs the value resulting from the addition.

Subsequently, the stead-state error calculator 94_x calculates, by a calculator 94$b$_x, the value obtained by subtracting the input Vb_x_mdfd p from the output value of the proportional-differential compensation component 94_x, then supplies the output value of the calculator 94$b$_x to a low-pass filter 94$c$_x having a phase compensation function. The low-pass filter 94$c$_x is a filter whose transfer function is denoted by $(1+T2 \cdot S)/(1+T1 \cdot S)$. Then, the stead-state error calculator 94_x outputs the output value Vb_x_prd of the low-pass filter 94$c$_x.

The stead-state error calculator 94_y receives the estimated center-of-gravity velocity value in the Y-axis direction Vb_y_s and also receives the previous value Vb_y_mdfd p of the desired center-of-gravity velocity for control in the Y-axis direction Vb_y_mdfd through the intermediary of a delay element 96_y.

Then, similar to the stead-state error calculator 94_x described above, the stead-state error calculator 94_y performs the process by a proportional-differential compensation component 94$a$_y, a calculator 94$b$_y, and a low-pass filter 94$c$_y in order and outputs an output value Vb_y_prd of the low-pass filter 94$c$_y.

Here, the output value Vb_x_prd of the stead-state error calculator 94_x may be used as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y may be used as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the expected center-of-gravity velocity stead-state error values.

After the process performed by the stead-state error calculators 94_x and 94_y as described above, the center-of-gravity velocity restrictor 76 supplies the expected center-of-gravity velocity stead-state error values Vb_x_prd and Vb_y_prd to a limiting processor 100. The process performed by the limiting processor 100 is the same as the process performed by the limiting processor 86 of the gain adjustor 78 described above. As indicated by the reference characters in parenthesis in FIG. 11, only the input values and the output values of the individual processing sections of the limiting processor 100 are different from those of the limiting processor 86.

Specifically, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_prd and Vb_y_prd, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Thereafter, the rotational angular velocities ω_R_t and ω_L_t are limited to values within the permissible range for the right motor and the permissible range for the left motor, respectively, by limiters 86c_R and 86c_L. After the limitation process, the processed values w_R_lim2 and w_L_lim2 are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding respectively to the rotational angular velocities ωw_x_lim2 and ωw_y_lim2 are calculated by the processors 86e_x and 86e_y, respectively, and the calculated moving velocities Vw_x_lim2 and Vw_y_lim2 are output from the limiting processor 100.

Similar to the limiting processor 86, according to the process performed by the limiting processor 100, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges.

The permissible ranges for the right motor and left motor in the limiting processor 100 do not have to be the same as the permissible ranges in the limiting processor 86, and the permissible ranges may be different from each other.

Referring back to the description of FIG. 12, the center-of-gravity velocity restrictor 76 then performs the process by calculators 102_x and 102_y to calculate the desired center-of-gravity velocities for control Vb_x_mdfd and Vb_y_mdfd, respectively. Specifically, the calculator 102_x calculates a value, which is obtained by subtracting the expected center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_y calculates a value, which is obtained by subtracting the expected center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

If the output values V_x_lim2 and V_y_lim2 are not forcibly restricted by the limiting processor 100, that is, the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the expected center-of-gravity velocity stead-state error values Vb_x_prd and Vb_y_prd, respectively, the desired center-of-gravity velocities for control Vb_x_mdfd and Vb_y_mdfd are both determined to be zero. Thereby, generally Vb_x_mdfd=Vb_y_mdfd=0.

On the other hand, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the expected center-of-gravity velocity stead-state error values Vb_x_prd and Vb_y_prd, then for the X-axis direction, a correction amount between the input value Vb_x_prd and the output value Vw_x_lim2 of the limiting processor 100 (=Vw_x_lim2−Vb_x_prd) is determined as the desired center-of-gravity velocity for control in the X-axis direction Vb_x_mdfd.

Further, a correction amount between the input value Vb_y_prd and the output value Vw_y_lim2 of the limiting processor 100 (=Vw_y_lim2−Vb_y_prd) is determined as the desired center-of-gravity velocity for control in the Y-axis direction Vb_y_mdfd.

Accordingly, for the velocity in the X-axis direction for example, the desired center-of-gravity velocity for control Vb_x_mdfd has a direction opposite to the expected center-of-gravity velocity stead-state error value in the X-axis direction Vb_x_prd output from the stead-state error calculator 94_x. The same applies to the velocity in the Y-axis direction.

The above has described the process performed by the center-of-gravity velocity restrictor 76.

Returning to the description of FIG. 9, after carrying out the process by the center-of-gravity velocity restrictor 76, the gain adjustor 78 and the error calculator 70 as described above, the control unit 50 carries out the process by the posture control calculator 80. The process by the posture control calculator 80 will be described below with reference to FIG. 13.

Figure 13:
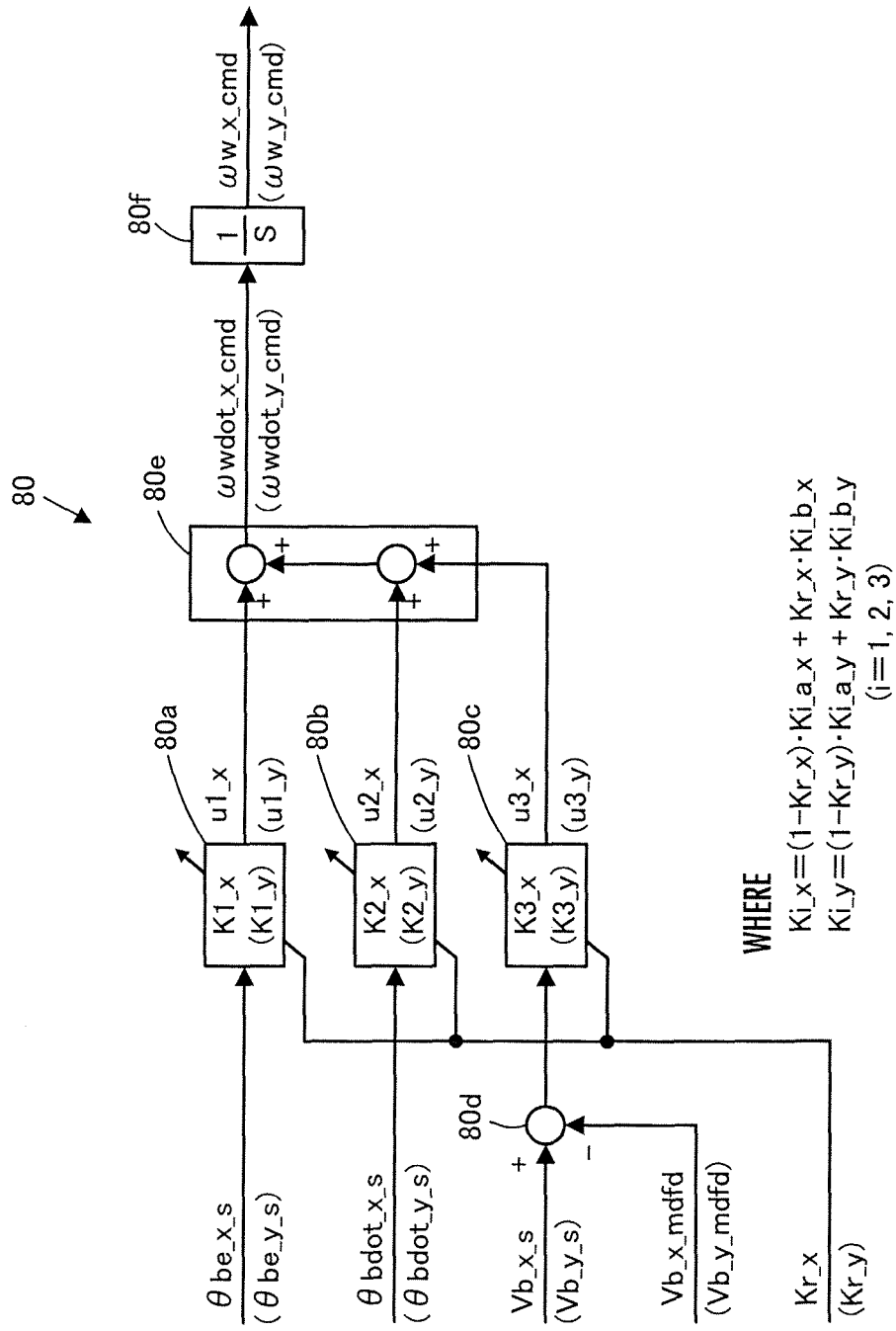
FIG. 13 is a block diagram illustrating a processing function of a posture control calculator 80 illustrated in FIG. 9.

The reference characters without parenthesis in FIG. 13 are the reference characters related to the processing for determining the imaginary wheel rotational angular velocity command ωw_x_cmd, which is the desired value of the rotational angular velocity of the imaginary wheel 62_x circumrotating in the X-axis direction. The reference characters in parenthesis are the reference characters related to the processing for determining the imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the STEP 2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωdotw_xy_cmd according to the following expressions 07x and 07y by using the above received values.

$$\omega \text{wdot\_x\_cmd} = K1\_x \cdot \theta be\_x\_s + K2\_x \cdot \theta bdot\_x\_s + K3\_x \cdot (Vb\_x\_s - Vb\_x\_mdfd) \quad \text{Expression 07x}$$

$$\omega \text{wdot\_y\_cmd} = K1\_y \cdot \theta be\_y\_s + K2\_y \cdot \theta bdot\_y\_s + K3\_y \cdot (Vb\_y\_s - Vb\_y\_mdfd) \quad \text{Expression 07y}$$

Hence, according to the present embodiment, the imaginary wheel rotational angular acceleration command ωdotw_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωdotw_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of the expressions 07x and 07y).

The gain coefficients K1_x, K2_x, and K3_x related to each manipulated variable components in the expression 07x are variably set on the basis of the gain adjustment parameter Kr_x, while the gain coefficients K1_y, K2_y, and K3_y related to each manipulated variable components in expression 07y are variably set on the basis of the gain adjustment parameter Kr_y. Hereinafter, the gain coefficients K1_x, K2_x, and K3_x in the expression 07x may be referred to as the first gain coefficient K1_x, the second gain coefficient K2_x, and the third gain coefficient K3_x, respectively. The same applies to the gain coefficients K1_y, K2_y, and K3_y in the expression 07y.

An i-th gain coefficient Ki_x (i=1, 2, or 3) in the expression 07x and an i-th gain coefficient Ki_y (i=1, 2, or 3) in the expression 07y are determined on the basis of the gain adjustment parameters Kr_x and Kr_y according to expressions 09x and 09y given below, as indicated by the notations in FIG. 13.

$$Ki\_x = (1 - Kr\_x) \cdot Ki\_a\_x + Kr\_x \cdot Ki\_b\_x \quad \text{Expression 09x}$$

$$Ki\_y = (1 - Kr\_y) \cdot Ki\_a\_y + Kr\_y \cdot Ki\_b\_y (i=1, 2, 3) \quad \text{Expression 09y}$$

Wherein, Ki_a_x and Ki_b_x in the expression 09x denote constant values set preliminarily as the gain coefficient values on a minimum end (an end close to zero) of the i-th gain coefficient Ki_x and as the gain coefficient value on a maximum end (an end away from zero), respectively. The same applies to Ki_a_y and Ki_b_y in the expression 09y.

Thus, each i-th gain coefficient Ki_x (i=1, 2 or 3) used for the calculation in the expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches from 0 to 1, the i-th gain coefficient Ki_x approaches from Ki_a_x to Ki_b_x.

Similarly, each i-th gain coefficient Ki_y (i=1, 2 or 3) used for the calculation in the expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

As mentioned in the above, normally (specifically, if the output values Vw_x_lim1 and Vw_y_lim1 are not forcibly restricted by the limiting processor 86 in the gain adjustor 78), Kr_x and Kr_y are both equal to zero. Therefore, in general, the i-th gain coefficient Ki_x=Ki_a_x (i=1, 2 or 3) and Ki_y=Ki_a_y (i=1, 2 or 3).

Supplementally, the constant values Ki_a_x, Ki_b_x and Ki_a_y, Ki_b_y (i=1, 2 or 3) are included in the constant parameters, the values of which are set in the STEP 6 or STEP 8.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More specifically, as illustrated in FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 performs the calculation according to the expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

Specifically, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80a and 80b, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80d, and calculates, by the processor 80c, a manipulated variable component u3_y obtained by multiplying the calculated difference by the third gain coefficient K3_y. Then, the posture control calculator 80 adds up these manipulated variable components u1_y, u2_y, and u3_y by the calculator 80e so as to calculate the imaginary wheel rotational angular acceleration command ωwdot_x_cmd.

Here, the first term (=the first manipulated variable component u1_x) and the second term (=the second manipulated variable component u2_x) of the right side of expression 07x denote the feedback manipulated variable components for converging the base body tilt angle error measured value θbe_x_s in the direction about the X-axis to zero (converging the base body tilt angle measured value θb_x_s to the desired value θb_x_obj) by the PD law (proportional-differential law) serving as the feedback control law.

Further, at the right side of the expression 07x, the third term (=the third manipulated variable component u3_x) denotes a feedback manipulated variable component for converging the difference between the estimated center-of-gravity velocity value Vb_x_s and the desired center-of-gravity velocity for control Vb_x_mdfd to zero (converging Vb_x_s to Vb_x_mdfd) by a proportional law serving as the feedback control law.

The same applies to the first to the third terms (the first to the third manipulated variable components u1_y, u2_y, and u3_y) of the right side of the expression 07y.

As mentioned in the above, in general (the output values V_x_lim2 and V_y_lim2 are not forcibly restricted by the limiting processor 100 of the center-of-gravity velocity restrictor 76), the desired center-of-gravity velocities for control Vb_x_mdfd and Vb_y_mdfd are both equal to zero. If Vb_x_mdfd=Vb_y_mdfd=0, then, the third manipulated variable component u3_x equals to a value obtained by multiplying the estimated center-of-gravity velocity value Vb_x_s by the third gain coefficient K3_x and the third manipulated variable component u3_y equals to a value obtained by multiplying the estimated center-of-gravity velocity value Vb_y_s by the third gain coefficient K3_y.

After the calculation of the imaginary wheel rotational angular acceleration commands ωwdot_x_cmd and ωwdot_y_cmd as described above, the posture control calculator 80 integrates the ωwdot_x_cmd and ωwdot_y_cmd by an integrator 80f thereby to determine the imaginary wheel rotational velocity commands ωw_x_cmd and ωw_y_cmd.

The above has described the details of the process performed by the posture control calculator 80.

Supplementally, the imaginary wheel rotational angular acceleration command ωdotw_x_cmd may alternatively be calculated by an expression wherein the third term of the right side of the expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωdotw_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

In the present embodiment, the rotational angular acceleration commands ωwdot_x_cmd and ωwdot_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of the imaginary wheels 62_x and 62_y (i.e., the frictional forces between the imaginary wheels 62_x, 62_y and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and performs the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86b of the limiting processor 86 (refer to FIG. 11).

To be more specific, the motor command calculator 82 determines the velocity commands ω_R_cmd and ω_L_cmd of the electric motors 31R and 31L by solving a simultaneous equation obtained by replacing ωw_x, ωw_y, ω_R and ω_L of the above-mentioned expressions 01a and 01b by ωw_x_cmd, ωw_y_cmd, ω_R_cmd and ω_L_cmd, respectively, with the ω_R_cmd and ω_L_cmd serving as unknowns.

Thus, the vehicle control arithmetic process in the STEP 11 is completed.

According to the control arithmetic process carried out by the control unit 50 as described above, in either operation mode of the boarding mode and the autonomous mode, the imaginary wheel rotational angular acceleration command ωdotw_xy_cmd denoting the manipulated variables (control inputs) is determined in such a way that the vehicle system center-of-gravity point (the vehicle-occupant overall center-of-gravity point or the vehicle-alone center-of-gravity point) is stationary while the posture of the seat 3 and the base body 9 are maintained at a posture in which the base body tilt angle error measured value θbe_x_s and θbe_y_s are both equal to zero (hereinafter, this posture will be referred to as the basic posture). When the posture of the seat 3 and the base body 9 is tilted from the basic posture, in other words, the position of the vehicle system center-of-gravity point in the lateral direction is shifted away from the position located substantially right above the ground contact surface of the wheel assembly 5, the imaginary wheel rotational angular acceleration command ωdotw_xy_cmd is determined so as to reset the posture of the seat 3 and the base body 9 back to the basic posture (to approximate θbe_x_s and θbe_y_s to zero or maintain them at zero).

Then, the rotational angular velocities of the electric motors 31R and 31L, respectively, obtained by converting the imaginary wheel rotational angular velocity commands ωw_xy_cmd, which is obtained by integrating each component of ωdotw_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62_x corresponding to ωw_x_cmd and the moving velocity of the imaginary wheel 62_y corresponding to ωw_y_cmd, respectively.

Accordingly, if, for example, the actual base body tilt angle θb_x deviates from the desired value θb_x_obj in the direction about the Y-axis by leaning forward, then the wheel assembly 5 moves forward to eliminate the deviation (to converge θbe_x_s to zero). Similarly, if the actual θb_x deviates from the desired value θb_x_obj by leaning backward, then the wheel assembly 5 moves backward to eliminate the deviation (to converge θbe_x_s to zero).

If, for example, the actual base body tilt angle θb_y deviates from the desired value θb_y_obj in the direction about the X-axis by leaning rightward, then the wheel assembly 5 moves rightward to eliminate the deviation (to converge θbe_y_s to zero). Similarly, if the actual θb_y deviates from the desired value θb_y_obj by leaning leftward, then the wheel assembly 5 moves leftward to eliminate the deviation (to converge θbe_y_s to zero).

If both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the posture of the seat 3 and the base body 9 tilts from the basic posture, then the wheel assembly 5 moves toward the tilted side. Hence, if, for example, the occupant intentionally inclines his/her upper body together with the seat 3 and the base body 9 in the boarding mode, then the wheel assembly 5 moves to the tilted side. It should be noted that in the present embodiment, when the seat 3 and the base body 9 are tilted from the normal posture, the moving direction in the horizontal plane of the vehicle system center-of-gravity point (moving direction orthogonal to the Z axis) may not always agree to the moving direction of the wheel assembly 5.

When the wheel assembly 5 is moving (the entire vehicle 1 is moving), if the posture of the seat 3 and the base body 9 is maintained at a constant posture (where the base body tilt angle error measured value θbe_xy_s is constant) tilted from the normal posture, the travelling velocity of the vehicle system center-of-gravity point (and consequently the travelling velocity of the wheel assembly 5) is converged to have a constant difference from the desired center-of-gravity velocity for control Vb_xy_mdfd and the difference is dependent on the base body tilt angle error measured value θbe_xy_s.

In the present embodiment, if the travelling motion of the wheel assembly 5 is normally performed in a moving velocity when the rotational angular velocities of the electric motors 31R and 31L are not excessively high (more precisely, if the output values V_x_lim2 and V_y_lim2 are not forcibly restricted by the limiting processor 100 of the center-of-gravity velocity restrictor 76), the desired center-of-gravity velocities for control Vb_x_mdfd and Vb_y_mdfd are both maintained at zero. When the Vb_x_mdfd and Vb_y_mdfd are being maintained at zero, if the posture of the seat 3 and the base body 9 is maintained at a constant posture tilted from the normal posture, the travelling velocity of the vehicle system center-of-gravity point (and consequently the travelling velocity of the wheel assembly 5) is converged to a traveling velocity having a magnitude and direction dependent on the base body tilt angle error measured value θbe_xy_s.

The vehicle 1 of the present embodiment configured to perform the above-mentioned operations operates in the following way when the reclining state is detected as mentioned in the above.

For example, as illustrated in FIG. 2, when the occupant P sits down on the seat 3 (payload supporting part) from the front side of the vehicle 1 in halt with both legs thereof contacting the floor, as above-mentioned, the reclining state is determined according to the detection of the force Fx applied to the seat 3 in the fore-and-aft direction (X-axis direction) by the load sensor 54.

Accordingly, the manipulated variable for control configured to apply a driving power for driving the travelling motion unit, namely the wheel assembly 5 (in the present embodiment, imaginary wheel rotational angular acceleration command ωdotw_xy_cmd) is determined by adding the desired angle correction angle Δθb_xy determined according to the force Fx to the desired value θb_xy_obj set in the reclining mode process of STEP 10 (in other words, to set the desired value at θb_xy_obj+Δθb_xy) so as to tilt the base body 9 in the direction opposite to the direction of the force Fx (direction to the front side in FIG. 2).

Figure 14:
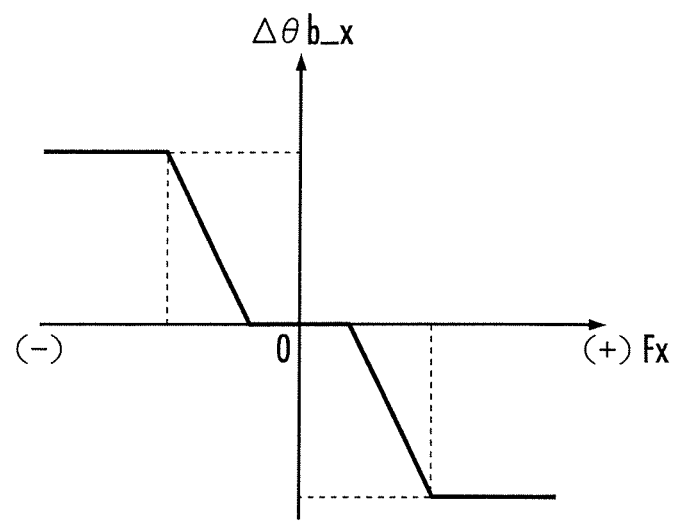
FIG. 14 is a graph illustrating a variation of a angle difference with respect to a load applied in a reclining state of the mobile apparatus according to an embodiment.

The desired angle correction angle Δθb_xy is preliminarily defined as a function of Fx as illustrated in FIG. 14, for example, in the case when the force Fx in the X-axis direction is applied to the payload supporting part. Specifically, it is set that if the magnitude of the force Fx (frontward direction is set as "+") is close to "0", then the Δθb_xy=0 (i.e., to set a dead zone); and the Δθb_xy will be greater as the force Fx becomes greater (proportional); however, if the magnitude of the force Fx becomes equal to or greater than a predefined value, the Δθb_xy is constant.

More specifically, when the force Fx has a frontward direction (+), the Δθb_xy is "−" and |Δθb_xy| increases in proportion to the magnitude of the force Fx; however, when the magnitude of the force Fx becomes equal to or greater than the predefined value, the |Δθb_xy| is constant. On the other hand, when the force Fx has a backward direction (−), the Δθb_xy is "+" and |Δθb_xy| increases in proportion to the magnitude of the force Fx; however, when the magnitude of the force Fx becomes equal to or greater than the predefined value, the |Δθb_xy| is constant.

Moreover, in the detection of the reclining state by the control unit 50 according to the load Fz applied to the seat 3, namely the payload supporting part in the vertical direction, the load measured when the occupant is aboard on the vehicle 1 with the feet free from the floor is stored as the body weight of the occupant, if the load Fz measured thereafter is less than the body weight of the occupant, then it is determined as the reclining state by the control unit 50.

Figure 15:
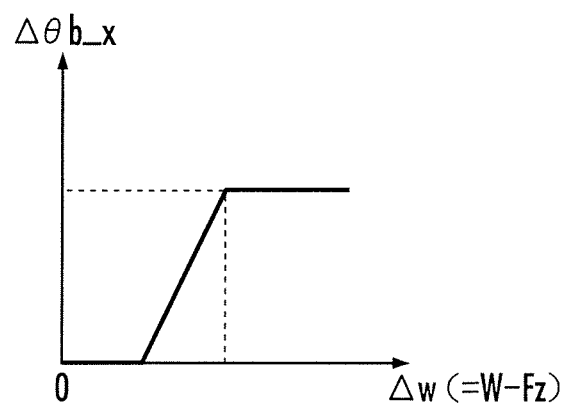
FIG. 15 a graph illustrating a variation of an angle difference with respect to a decrement of body weight applied to the payload supporting part in a reclining state of the mobile apparatus according to an embodiment.

Accordingly, as illustrated in FIG. 15, for example, the desired angle correction value Δθb_xy added to the desired value θb_xy_obj set in the reclining mode process of STEP 10 is preliminarily defined as a function of body weight decrement ΔW (=W−Fz). Specifically, it is set that if the body weight decrement ΔW is close to "0", then the Δθb_xy=0 (i.e., to set a dead zone); and the Δθb_xy will be greater as the body weight decrement ΔW becomes greater (proportional); however, if the magnitude of body weight decrement ΔW becomes equal to or greater than a predefined value, the Δθb_xy is constant (equal to an upper limit).

It should be noted that the purpose of setting an upper limit in the examples of the desired angle correction value is to prevent the control on the tilt angle of the vehicle 1 according to positive feedback from diverging.

According to the vehicle 1 of the present embodiment, the tilt angle difference is added appropriately to the desired tilt angle (tilt angle of the base body so that the overall center-of-gravity point of the occupant and the vehicle is positioned substantially right above the ground contact point) according to the reclining load. Accordingly, the vehicle 1 can generate a force in the direction of supporting the body of the user, enabling the user reclining on the base body in the reclining state. In other words, by setting the desired tilt angle of the base body to counter against the reclining load from the user, it is possible for the vehicle 1 to realize the reclining state.

Specifically, since the manipulate variable for control is determined by setting the desired angle at θb_xy_obj+Δθb_xy so as to drive the travelling motion unit (wheel assembly 5) in the direction of supporting the body of the occupant on the base body 9, the travelling motion unit is driven in the direction of supporting the body of occupant resting on the payload supporting part (seat 3). According thereto, the vehicle 1 can stop in the position of supporting the body of occupant by the base body 9, enabling the occupant reclining against the base body in the reclining state.

Here, the correspondence relationship between the vehicle 1 of the first and the second embodiments and the present invention will be supplementally described.

In the present embodiment, the fore-and-aft direction and the lateral direction of the occupant aboard on the vehicle 1 are equivalent to the X-axis direction and the Y-axis direction, respectively. The vehicle system center-of-gravity point is equivalent to a predefined representative point of the vehicle.

The process performed by the controller 50 in STEP 11 and STEP 12 of FIG. 7 embodies the travelling motion unit controller of the present invention. The arithmetic process performed by the posture control calculator 80 according to the expressions 07x and 07y determines the manipulated variable for control. The tilt sensor 52 and the process performed in STEP 2 of FIG. 7 embody the tilt angle measuring element of the present invention. The representative point velocity measuring element of the present invention is embodied by the center-of-gravity velocity calculator 72.

The base body tilt angle error measured value θbe_xy_s is equivalent to the tilt difference in the present invention, and in the θbe_xy_s, θbe_x_s and θbe_y_s are equivalent to a first tilt difference component and a second tilt difference component, respectively. The imaginary wheel rotational angular acceleration commands ωdotw_x_cmd and ωdotw_y_cmd are equivalent to the manipulated variable for control in the present invention.

Some modifications related to the embodiments described above will now be described.

In the above-mentioned embodiments, it is described that the vehicle system center-of-gravity point (more accurately, the overall vehicle-occupant center-of-gravity point) is equivalent to the predefined representative point of the vehicle 1; however, it is acceptable to set the representative point as the central point of the wheel assembly 5, a point in a predefined portion (for example the support frame 13) of the base body 9 or the like.

In the above-mentioned embodiments, the gain coefficients K1_x, K3_x, K1_y and K3_y are determined in such a way that |K3_x|/|K1_x|<|K3_y|/|K1_y|. However, in the present embodiment, if the rotation angular velocity of one or both of the electric motors 31R and 31L is not excessively high, that is to say, in a normal state (specifically, if the output values Vw_x_lim1 and Vw_y_lim1 are not forcibly restricted by the limiting processor 86 in the gain adjustor 78), then the gain coefficients K1_x, K3_x, K1_y and K3_y are equal to the constants K1_a_x, K3_a_x, K1_a_y and K3_a_y, respectively. Thus, for example, only in the normal state, it is acceptable to set |K3_x|/|K1_x|<|K3_y|/|K1_y|. In this case, it is acceptable to set the constants K1_a_x, K3_a_x, K1_a_y and K3_a_y so that |K3_a_x|/|K1_a_x|<|K3_a_y|/|K1_a_y|.

Further, it is acceptable to appropriately determine the gain coefficients K1_x, K3_x, K1_y and K3_y in such a way that |K3_x|/|K1_x|>|K3_y|/|K1_y| opposite to the above according to the operation conditions or environments of the vehicle 1, the switch operation by the occupant or the like. Accordingly, when the vehicle 1 is moved in the Y-axis direction, the irregular variation on the moving direction of the wheel assembly 5 with respect to the Y-axis direction can be inhibited.

In the above-mentioned embodiments, the gain coefficient Ki_xy (i=1, 2, 3) is modified appropriately according to the gain adjusting parameter Kr_xy; however, it is acceptable to maintain the gain coefficient Ki_xy (i=1, 2, 3) constant in one or both of the boarding mode and the autonomous mode. If the gain coefficient Ki_xy (i=1, 2, 3) is maintained constant, the process by the gain adjuster 78 is unnecessary.

In the abovementioned embodiments, the vehicle 1 illustrated in FIG. 1 and FIG. 2 is given as an example; however, the inverted pendulum type vehicle 1 according to the present invention is not limited to the vehicle described in the above-mentioned embodiments.

Specifically, the wheel assembly 5 serving as the traveling motion unit of the vehicle 1 in the present embodiment has an one-piece construction. Alternatively, however, the wheel assembly 5 may have a construction shown in, for example, FIG. 10 of the Patent Document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

It is acceptable that the traveling motion unit may have a crawler-shaped structure, as shown in, for example, FIG. 3 of the Patent Document 2. Alternatively as shown, for example, in FIG. 5 of the Patent Document 2, FIG. 7 of the Patent Document 3, or FIG. 1 of the Patent Document 1, the traveling motion unit may be constructed of a spherical member, and the vehicle may be constructed such that the spherical member is rotatively driven in a direction about the X-axis and a direction about the Y-axis by an actuator (e.g., an actuator having the wheel assembly 5).

Further, in the present embodiment, the vehicle 1 provided with the seat 3 as the payload supporting part for an occupant has been exemplified. Alternatively, however, the inverted pendulum type mobile apparatus according to the present invention is not limited to a vehicle for boarding a user; it may be a vehicle for mounting and transporting goods or the like. It is also acceptable for it to support the user's body only without the payload supporting part provided for boarding the user or mounting the goods.

Furthermore, the inverted pendulum type vehicle may be a vehicle having a construction wherein a step on which an occupant rests his/her both feet and a section to be gripped by the occupant are mounted on a base body, as illustrated in, for example, FIG. 8 in patent document 3.

Thus, the present invention can be applied to inverted pendulum type vehicles of various constructions, as illustrated in the patent documents 1 to 3 and the like.

Further, the inverted pendulum type mobile apparatus according to the present invention may be provided with a plurality of traveling motion units movable in all directions on a floor surface (e.g., two in the lateral direction, or two in the fore-and-aft direction, or three or more).

Further, in the inverted pendulum type mobile apparatus according to the present invention, it is not essential for the base body to tilt together with the payload supporting part for the occupant. For example, in the case where the vehicle includes a plurality of the traveling motion units, it is acceptable that the base body to which the traveling motion units are assembled is configured not to tilt with respect to the floor surface and the payload supporting part is assembled to the base body freely tiltable with respect to the base body.

DESCRIPTION OF REFERENCE NUMERALS

1 . . . inverted pendulum type vehicle capable of moving in all directions; 3 . . . seat (payload supporting part); 5 . . . wheel assembly (traveling motion unit); 7 . . . actuator; 9 . . . base body; 50 . . . control unit; 52 . . . tilt sensor (tilt angle measuring element); 54 . . . load sensor

What is claimed is:

1. A control device of an inverted pendulum type mobile apparatus having a travelling motion unit capable of moving on a floor surface, an actuator which drives the travelling motion unit, and a base body mounted with the travelling motion unit and the actuator and configured to be tiltable with respect to the perpendicular direction, comprising:
   a tilt angle measuring element configured to generate an output according to an actual tilt angle of the base body;
   a force detector configured to detect at least a force applied to the base body in the horizontal direction; and
   a travelling motion unit controller configured to determine a manipulated variable for control which is configured to define a driving power to be applied to the travelling motion unit so as to approximate a tilt difference between a measured value of the tilt angle and a desired tilt angle to zero by using the measured value of a tilt angle of the base body denoted by the output from the tilt angle measuring element, a predefined value of the desired tilt angle, an output from the force detector; and a manipulation-adjusting variable allowed to be set variably, and to control the travelling motion of the travelling motion unit via the actuator according to the determined manipulated variable for control;
   wherein the travelling motion unit controller is configured to determine the manipulated variable for control of the travelling motion unit so as to tilt the base body toward a direction opposite to a direction of the force detected by the force detector.

2. A control device of an inverted pendulum type mobile apparatus having a travelling motion unit capable of moving on a floor surface, an actuator which drives the travelling motion unit, a base body mounted with the travelling motion unit and the actuator, and a payload supporting part for a user fixed to the base body so as to be tiltable with respect to the perpendicular direction, comprising:
   a reclination detector configured to detect a reclining state where the user has the body thereof supported by the base body with a foot thereof contacting the floor when the mobile apparatus is in halt;
   a tilt angle measuring element configured to generate an output according to an actual tilt angle of the base body; and
   a travelling motion unit controller configured to determine a manipulated variable for control which is configured to define a driving power to be applied to the travelling motion unit so as to approximate a tilt difference between a measured value of the tilt angle and a desired tilt angle to zero by using the measured value of a tilt angle of the base body denoted by the output from the tilt angle measuring element, a predefined value of a desired tilt angle, a detection output from the reclination detector; and a manipulation-adjusting variable allowed to be set variably, and to control the travelling motion of the travelling motion unit via the actuator according to the determined manipulated variable for control;
   wherein the travelling motion unit controller is configured to determine the manipulated variable for control so as to drive the travelling motion unit toward a direction for the base body to support the body of the user when the reclining state is detected by the reclination detector.

3. The control device of an inverted pendulum type mobile apparatus according to claim 2, wherein
   the reclination detector is provided with a force detector configured to detect at least a force applied to the payload supporting part in the horizontal direction; and
   the travelling motion unit controller is configured to determine the manipulated variable for control configured to impose a driving power to move the travelling motion unit so as to tilt the base body toward a direction opposite to a direction of the force detected by the force detector.

4. The control device of an inverted pendulum type mobile apparatus according to claim 3, wherein
   the force detector is composed of a triaxial force sensor configured to detect a load applied to the payload supporting part; and
   the travelling motion unit controller is configured to determine the manipulated variable for control configured to impose the driving power according to an external force in the front-back direction detected by the triaxial force sensor.

5. The control device of an inverted pendulum type mobile apparatus according to claim 3, wherein
   the force detector is composed of an uniaxial force sensor configured to detect a load applied to the payload supporting part in the perpendicular direction; and
   the travelling motion unit controller is configured to determine the manipulated variable for control configured to impose the driving power according to a decrement in the load when the load detected by the uniaxial force sensor is less than a body weight of the user.

6. The control device of an inverted pendulum type mobile apparatus according to claim 2, wherein the reclination detector is provided with a manual switch disposed in the base body and detects the reclining state when the manual switch is turned on.

7. The control device of an inverted pendulum type mobile apparatus according to claim 1, wherein
   the reclination detector is provided with a foot-stepping force detector configured to detect a force applied to a foot step attached to the base body; and
   the travelling motion unit controller is configured to determine the manipulated variable for control configured to impose the driving power when no force is detected by the foot-stepping force detector.

* * * * *